(12) United States Patent
Funk

(10) Patent No.: US 10,264,245 B2
(45) Date of Patent: Apr. 16, 2019

(54) METHODS AND SYSTEM FOR GENERATING THREE-DIMENSIONAL SPATIAL IMAGES

(71) Applicant: Walter Joseph Funk, Oakland, CA (US)

(72) Inventor: Walter Joseph Funk, Oakland, CA (US)

(73) Assignee: Walter Joseph Funk, Oakland, CA (US)

( * ) Notice: Subject to any disclaimer, the term of this patent is extended or adjusted under 35 U.S.C. 154(b) by 207 days.

(21) Appl. No.: 15/452,540

(22) Filed: Mar. 7, 2017

(65) Prior Publication Data

US 2018/0262741 A1 Sep. 13, 2018

(51) Int. Cl.
| | |
|---|---|
| *H04N 13/324* | (2018.01) |
| *H04N 13/31* | (2018.01) |
| *H04N 13/398* | (2018.01) |
| *G02B 27/22* | (2018.01) |
| *H04N 13/322* | (2018.01) |
| *G02B 27/12* | (2006.01) |
| *G02B 27/10* | (2006.01) |

(52) U.S. Cl.
CPC ....... *H04N 13/324* (2018.05); *G02B 27/2271* (2013.01); *H04N 13/31* (2018.05); *H04N 13/322* (2018.05); *H04N 13/398* (2018.05); *G02B 27/1006* (2013.01); *G02B 27/123* (2013.01)

(58) Field of Classification Search
None
See application file for complete search history.

(56) References Cited

U.S. PATENT DOCUMENTS

| | | |
|---|---|---|
| 3,732,630 A | 5/1973 | Crosbie et al. |
| 3,956,833 A | 5/1976 | Chase |
| 4,000,367 A | 12/1976 | Field |

(Continued)

FOREIGN PATENT DOCUMENTS

EP      0858612 B1     8/2001

OTHER PUBLICATIONS

Amery, John et al., "Flight Simulation Visual Requirements and a New Display System", Proceedings of SPIE. vol. 3690., 1999, pp. 356-367.

(Continued)

*Primary Examiner* — Samira Monshi
(74) *Attorney, Agent, or Firm* — Perkins Coie LLP

(57) ABSTRACT

The disclosure is directed to a 3D imaging system that generates a three-dimensional (3D) spatial image of a source content, e.g., images or videos. The source content is a two-dimensional (2D) color-encoded content in which different portions of the source content are encoded with different colors based on a depth at which the corresponding portion is to be formed relative to the other portions in the 3D spatial image. The 3D imaging system includes an optical component, e.g., a Fresnel lens, to generate the 3D spatial image. In the aerial viewing configuration of the 3D imaging system, the 3D imaging system generates the 3D spatial image in a space between the optical component and a viewer. In the infinity viewing configuration of the 3D imaging system, the 3D imaging system generates the 3D spatial image in a space between the optical component and optical infinity.

23 Claims, 21 Drawing Sheets
(16 of 21 Drawing Sheet(s) Filed in Color)

(56) References Cited

U.S. PATENT DOCUMENTS

| | | | |
|---|---|---|---|
| 4,309,074 | A | 1/1982 | Granieri |
| 4,391,495 | A | 7/1983 | Mazurkewitz |
| 4,414,565 | A | 11/1983 | Shanks |
| 4,473,355 | A | 9/1984 | Pongratz |
| 4,597,634 | A | 7/1986 | Steenblik |
| 4,651,219 | A | 3/1987 | Rickert |
| 4,671,625 | A | 6/1987 | Noble |
| 4,717,239 | A | 1/1988 | Steenblik |
| H423 | H | 2/1988 | Mohon et al. |
| 5,002,364 | A | 3/1991 | Steenblik |
| 5,415,550 | A | 5/1995 | Aoki et al. |
| 5,629,796 | A | 5/1997 | Shanks |
| 5,726,806 | A | 3/1998 | Holden et al. |
| 5,782,547 | A | 7/1998 | Machtig et al. |
| 5,993,005 | A | 11/1999 | Geranio |
| 6,046,710 | A | 4/2000 | Holden et al. |
| 6,055,100 | A | 4/2000 | Kirk |
| 6,152,739 | A | 11/2000 | Amery et al. |
| 6,522,472 | B1 | 2/2003 | Green |
| 6,808,268 | B2 | 10/2004 | Rakosy et al. |
| 6,809,891 | B1 | 10/2004 | Kerr et al. |
| D506,464 | S | 6/2005 | Vrachan et al. |
| 7,016,116 | B2 | 3/2006 | Dolgoff |
| 7,492,523 | B2 | 2/2009 | Dolgoff |
| 7,562,983 | B2 | 7/2009 | Jang et al. |
| 7,646,540 | B2 | 1/2010 | Dolgoff |
| 7,719,770 | B2 | 5/2010 | Jang |
| 7,722,189 | B2 | 5/2010 | Miles |
| 7,868,847 | B2 | 1/2011 | Miles |
| 8,040,617 | B2 | 10/2011 | Jang |
| 8,279,268 | B2 | 10/2012 | Vrachan et al. |
| 2002/0126396 | A1 | 9/2002 | Dolgoff |
| 2003/0053033 | A1 | 3/2003 | Vrachan et al. |
| 2003/0164808 | A1 | 9/2003 | Amery et al. |
| 2006/0268013 | A1 | 11/2006 | Miles |
| 2006/0291051 | A1 | 12/2006 | Kim et al. |
| 2007/0223090 | A1 | 9/2007 | Dolgoff |
| 2008/0049151 | A1 | 2/2008 | Vrachan et al. |
| 2008/0051933 | A1 | 2/2008 | Vrachan et al. |
| 2008/0126396 | A1 | 5/2008 | Gagnon et al. |
| 2009/0109404 | A1 | 4/2009 | Thornton |
| 2009/0153976 | A1 | 6/2009 | Dolgoff |
| 2010/0177403 | A1 | 7/2010 | Dolgoff |
| 2010/0225749 | A1 | 9/2010 | Thornton et al. |
| 2010/0254001 | A1* | 10/2010 | Jang ............... H04N 13/346 359/479 |
| 2016/0005228 | A1* | 1/2016 | Niebla, Jr. ........ H04N 13/122 348/43 |

OTHER PUBLICATIONS

Bailey, Michael et al., "Using ChromaDepth to obtain Inexpensive Single-image Stereovision for Scientific Visualization", Journal of Graphics Tools, vol. 3, No. 3, Aug. 1999, pp. 1-9.

Brewster, , "Notice of a Chromatic Stereoscope", The London, Edinburgh, and Dublin Philosophical Magazine and Journal of Science 3.15, 1852, p. 48.

Chase, Wendell , "Evaluation of Several TV Display Systems for Visual Simulation of the Landing Approach", Ames Research Center, Mar. 1971, 47 pages.

Cox, Arthur , "Application of Fresnel Lenses to Virtual Image Display", 22nd Annual Technical Symposium. International Society for Optics and Photonics,, 1978, pp. 130-137.

Dolgoff, Gene , "Real-Depth TM imaging: a new 3-D imaging technology with inexpensive direct-view (no glasses) video and other applications", Proc. SPIE 3012, Stereoscopic Displays and Virtual Reality Systems IV, 282 doi:10.1117/12.274469;, May 15, 1997, pp. 282-288.

Dolgoff, Gene , "Real-DepthTM imaging: a new (no glasses) 3-D imaging technology with video/data projection applications", vol. 3013-26. In Proceedings—SPIE the International Society for Optical Engineering., 1997, pp. 214-221.

Dolgoff, Gene , "True-Depth TM: a new type of true 3-D volumetric display system suitable for CAD, medical imaging, and air-traffic control", SPIE vol. 3296 • 0277-786X/98 Part of the IS&T/SPIE Conference on Projection Displays IV. S, Downloaded From: http://proceedings.spiedigitallibrary.org/ on Aug. 7, 2013 Terms of Use: http://spiedl.org/terms, Jan. 1998, pp. 225-230.

Dolgoff, Gene , "Wide viewing angle floating 3-D display system (with no 3-D glasses)", 186 SPIE vol. 3296 • 0277-786X/98, Part of the IS&T/SPIE Conference on Projection Displays IV. San Jose, California, USA., Jan. 1998, pp. 186-190.

Dykes, Wiley , "The Improved Fresnel Virtual Image Display System", No. PMT-ET-0001-83. Naval Training Equipment Center Orlando FL, Feb. 1983, 113 pages.

Ganzler, Bruce , "Virtual Image Display for Flight Simulation", Ames Research Center, 1971, 19 pages.

Jang,, Sun-Joo et al., "100" 3D Real Image Rear-Projection Display System based-on Fresnel Lens, Proc. SPIE 5618, Integrated Optical Devices, Nanostructures, and Displays, 204, http://dx.doi.org/10.1117/12.579490, Nov. 30, 2004, pp. 204-211.

Moon, Jae-Woong et al., "Compensation of Image Distortion in Fresnel Lens-based 3D Projection Display System Using a Curved Screen", Proc. SPIE vol. 6016, Three-Dimensional TV, Video, and Display IV,, http://dx.doi.org/10.1117/12.631235, Nov. 15, 2005, pp. 601616-1 to 601616-9.

Noble, Lowell , "Use of Lenses to Enhance Depth Perception", OE LASE'87 and EO Imaging Symp. International Society for Optics and Photonics, Jan. 1987.

NPL Chromadepthdiag, , "NPL Chromadepthdiag", 1 page.

Steenblik, R. , "The chromostereoscopic process: a novel single image stereoscopic process", SPIE vol. 761 True 3D Imaging Techniques and Display Technologies, Jan. 1987.

Toon, John , "Throw Out Those Old 3-D Glasses: Cinnamon Oil, Old Handbook & Binary Optics Combine to Produce New 3-D Vision Technique", Georgia Institute of Technology—Research News, Sep. 8, 1992, 2 pages.

\* cited by examiner

METHODS AND SYSTEM FOR GENERATING THREE-DIMENSIONAL SPATIAL IMAGES

BACKGROUND

Spatial displays viewed without user worn apparatus, such as autostereoscopic displays, integral imaging displays, volumetric displays, holographic displays, aerial-image displays, and infinity displays present images which appear to have various spatial qualities. These and other various spatial display technologies have widely varying spatial qualities, imaging methods, limitations, physical construction and spatial image presenting capabilities. Autostereoscopic displays, such as the parallax barrier or lenticular methods, provide a multitude of viewing zones at different angles with the image in each zone appropriate to that point of view. Typically, a fine vertical grating or lenticular lens array is placed in front of a two-dimensional (2D) display screen. A stereoscopic image is divided into two alternating vertical bands, comprising alternating left/right views, and displayed on the 2D display screen. If the observer's eyes remain fixed at a particular location in space, then one eye can see only the right view bands through the grating or lens array, and the other eye can see only the left view bands. The eyes of the user must be within separate but adjacent viewing zones to see a stereoscopic image, and the viewing zone must be very narrow to prevent image distortions as the observer moves relative to the display. These techniques have several drawbacks.

Autostereoscopic displays typically require a large display resolution. Each eye sees only half the horizontal screen resolution, therefore the image's resolution is significantly reduced. If the displays provide multiple views of a stereoscopic image, each view provided lowers the display's resolution in half. Also, the observer must remain within viewing zones. Additionally, as the observer focuses on a single plane, conflicts between convergence and accommodation rapidly lead to eyestrain. The observer cannot focus on images of varying depth, as with other three-dimensional spatial displays, such as volumetric or holographic displays.

Projection devices are known in the art that project images so that they appear to float in the air. Most prior art aerial projection systems typically use a three-dimensional (3D) physical object as the source of the image. However, this cannot produce an arbitrary or moving image. Some methods produce floating images by either reflecting an electronic display from one or more curved mirrors, viewing an electronic display through an optical system comprised of retroreflectors combined with beam splitters or viewing an electronic display placed behind one or more lenses. These methodologies are termed reflective real-image displays or transmissive real-image displays, respectively. The imagery produced by a typical real-image display, is typically planar. The imagery has some spatial qualities, but the image otherwise has no true 3D spatial qualities.

Some methods create transmissive floating planar imagery from an electronic display placed behind a first Fresnel lens located behind a second Fresnel lens, which focus the light from the image source in front of the second Fresnel lens. They may also combine two floating planar images by aligning two image sources with two pairs of Fresnel lens (4 lenses in total), and optically combining them with a single half-silvered mirror (beam splitter). Two planar images are viewed by an observer, both floating in space, one in front of the other, comprised of 2D foreground and background imagery. Some of these methods suffer from the fact that both floating planar images appears to float within the housing, rather than preferably extending beyond the housing for increased viewability and impression of spaciousness. Additionally, the imagery produced by the two full set of optics and displays, has limited spatial impression as the imagery is merely comprised of two overlapping planar images separated by a small amount of space. More specifically, the imagery is lacking true three-dimensionality, as it has no smooth or deep spatial visual qualities.

BRIEF DESCRIPTION OF THE DRAWINGS

The patent or application file contains at least one drawing executed in color. Copies of this patent or patent application with color drawings(s) will be provided by the Office upon request and payment of the necessary fee.

DETAILED DESCRIPTION

Figure 1:
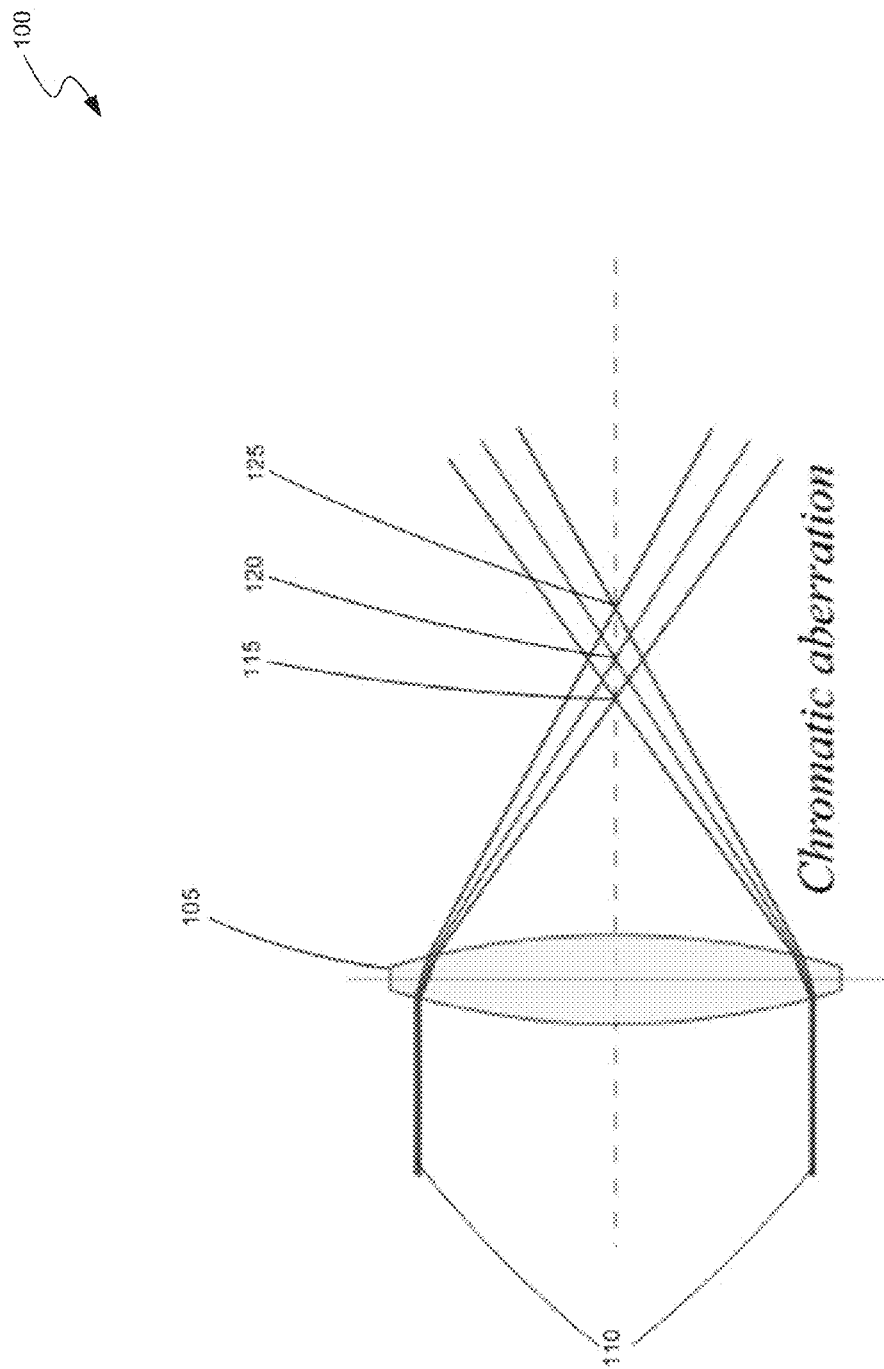
FIG. 1 is a block diagram of an example illustrating chromatic aberration phenomenon of an optical component, consistent with various embodiments.

Embodiments are directed to generating three-dimensional (3D) spatial images that can be viewed without any user-worn apparatus. A 3D imaging system includes an optical component that receives a two-dimensional (2D) content, e.g., a 2D image, from an image source and generates a 3D representation of the 2D content, e.g., a 3D spatial image. In some embodiments, the 3D representation is generated as a 3D image floating in space, hence, referred to as a 3D spatial image. The optical component can generate the 3D spatial image from a 2D content based on chromatic aberrations. In some embodiments, chromatic aberrations are a defect or a problem in an optical component, e.g., a lens, that occurs when a lens is either unable to bring all wavelengths of color to the same focal plane, and/or when wavelengths of color are focused at different positions in the focal plane. For example, in a given color sequence such as RGB, the red color focuses farthest from the lens, blue focuses closest to the lens and green focuses between red and blue. The 3D imaging system exploits the optical effect of the chromatic aberrations to focus light of varying wavelengths/colors from the 2D content at different points in space to generate the 3D spatial image from the 2D content. In some embodiments, to have specific portions in the 2D content formed at specified depths in the 3D spatial image, the 2D content is color encoded with appropriate colors. The 3D imaging system includes a content generator that generates color-encoded 2D content. The image source displaying the 2D color-encoded image is viewed through the optical component, which focuses the color encoded spatial images at different points in visual space.

The 3D imaging system can be implemented in various configurations. In a first configuration, referred to as "aerial viewing configuration," the optical component includes a pair of lenses, e.g., a pair of Fresnel lenses, which receives the color-encoded 2D content from an image source on one side of the pair of lenses and generates a 3D representation of the 2D content on the other side of the pair of lenses in a space between a viewer and the pair of lenses. The 3D spatial image appears to float in the space between the viewer and the pair of lenses. The optical component focuses the light of varying wavelengths from the 2D content at different points in space, in free space between the viewer and a "viewing window." The light of varying wavelengths, in the aerial viewing configuration, is focused at different points in real space to provide a perception of the 3D spatial image. The viewer can view the 3D spatial image without any user-worn apparatus, e.g., 3D glasses.

In a second configuration, referred to as "infinity viewing configuration," the optical component includes a single lens, e.g., a Fresnel lens, that receives the color-encoded 2D content from an image source on one side of the lens and generates a 3D representation of the 2D content on the same side of the lens. The 3D spatial image appears to be a magnified version of the 2D content and the background portion appears to be generated at or near optical infinity. The optical component focuses the light of varying wavelengths at different points in virtual image space, behind a "viewing window," which the viewer perceives as the 3D spatial image. The light of varying wavelengths, in the infinity viewing configuration like the aerial viewing configuration, is focused at different points in virtual image space.

The depth of the 3D spatial image, e.g., depth between specific portions of the 3D spatial image, can be controlled based on various factors, e.g., using specific colors for specific portions. For example, for background imagery (imagery which is formed farthest from the viewer), a combination of dark blue and black is typically used, and red color is used for foreground imagery, e.g., a portion of the imagery that is to be formed the nearest to the user. The use of dark blue and black is generally preferred of the sole use of dark blue, as the combination of dark blue and black adds texture and depth to most spatial scenes.

The spatial imagery produced by both viewing configurations may have pseudo-motion parallax. In some embodiments, motion parallax is a type of depth perception cue in which objects that are closer appear to move faster than objects that are farther. As the color red appears to be focused more forwardly than green or blue, when an observer moves position, the red components shift more rapidly than the green or blue components, and the green components likewise shift more rapidly than blue components. This may sometimes be perceived as a kind of pseudo-motion-parallax depending on content.

In both viewing configurations the spatial images are color encoded into 2D images and displayed on an image source, e.g., an electronic 2D display such as light emitting diode (LED) or liquid crystal display (LCD) monitors, plasma displays or alternatively by projection onto a 2D screen with digital light processing (DLP) projectors, lasers. The image displayed on the image source can be any 2D image, e.g., a static image or a dynamic image. The 2D image can be computer generated imagery (CGI), or images of real-world objects, or a combination. The 2D image can be color-encoded using various techniques, e.g., using 3D imaging software implemented in a content-generation system.

In the real world, the depth cues of convergence and accommodation are consistent and the convergence and accommodation mechanisms are linked together. Accommodation or re-focusing of the eye is required when moving from one object to the other. The eyes constantly refocus on nearer and farther objects in a real scene. In typical stereoscopic or autostereoscopic imaging systems, as an object gets farther from the plane of the screen or display, in front or behind, the convergence of the eyes change, but unlike the natural world, accommodation stays the same, since all image information is on one plane. The farther away from the image plane (screen or display) an object is, the larger the discrepancy between accommodation and convergence will be.

In typical stereoscopic or autostereoscopic imaging systems, convergence and accommodation stimuli are not linked, which can lead to visual conflicts and observer discomfort. The disclosed embodiments reduce or eliminate conflicts between accommodation and convergence by focusing different images at different depth locations in space. Correlation between accommodation and convergence allow the observer to focus at different depths within a 3D spatial scene, for extremely natural spatial viewing experience. Thus, the disclosed embodiments provide improved spatial imaging systems.

The 3D imaging system includes visual perceptual enhancements, which can be functional in nature, to provide a viewer with an enhanced spatial viewing experience, e.g., elimination of "flatness cues" and addition of environmental cues. In some embodiments, flatness cues are visual cues, which allow a viewer to determine whether or not a surface or an image is flat, and environmental cues are cues which relate the synthetic spatial imagery to the real world environment in which the viewer exists. These enhancements can optimize spatial perception of the imagery and greatly improve the perceived spatial visual experience. Examples of such enhancements include a mask system, visible reference objects, silhouettes, shadows of light and synthetic illumination. These visual perceptual enhancements can eliminate the flatness cues and reinforce the imagery's placement in the real-world space. The spatial imagery, which is focused at actual different points in a physical or virtual image space, is further enhanced by monoscopic depth cues/2D cues, which work in cooperation with the elimination of flatness cues and the addition of environmental cues. The differences in the visual presentation of spatial imagery in both the aerial viewing and the infinity viewing configurations may have be taken into consideration when designing or selecting the mask system and environmental cues for each viewing configuration.

Unlike a volumetric display, both viewing configurations do not place actual "voxels" of light at precise or specific points in space. In some embodiments, a voxel represents a value on a regular grid in 3D space. As with pixels in a bitmap, voxels themselves do not typically have their position, e.g., coordinates, explicitly encoded along with their values. Instead, the position of a voxel is inferred based upon its position relative to other voxels. However, many additional factors beyond where light is focused at various points in space contribute to the spatial perception of the imagery. These additional factors may be controlled in a manner, which will allow the observer to perceive the spatial imagery as deeper than the actual volume of depth in space the focused spatial imagery actually spans. The disclosed embodiments may not place actual voxels of light at precise or specific points in space.

The disclosed 3D imaging system can be used in various applications, e.g., art, entertainment, movies, video games, ornamental design, ambient lighting installations, special attractions, haunted houses, psychedelic light-shows, scientific visualization.

The 3D spatial image may be additionally enhanced with non-visual content, non-visual cues, and observer interaction techniques, e.g., by use of multi-channel spatial audio systems, synchronization with sound, motion sensors, human interface devices, tactile transducers, and real-time interaction.

Turning now to the figures, FIG. 1 is a block diagram of an example 100 illustrating chromatic aberration phenomenon of an optical component, consistent with various embodiments. The optical component 105 can be an optical component, e.g., an optical lens, that can be used in the disclosed 3D imaging system. As described above, chromatic aberration is an optical phenomenon in which the optical component is unable to focus all wavelengths to the same focal plane and instead focuses them at different focal planes. In the example 100, the optical component 105 focuses different wavelengths of light 110, e.g., colors, from an image source (not illustrated) at different focal planes. For example, the red color focuses farthest from the optical component 105 at a first focal plane 125, the blue color focuses closest to the optical component 105 at a second focal plane 115, and the green color focuses at a third focal plane 120 between the focal planes of red and blue. The 3D imaging system exploits the optical effect of the chromatic aberration to focus light of varying wavelengths/colors from the 2D content at different points in space, thereby giving a perception of depth in the generated 3D spatial image. The 3D imaging system uses the chromatic aberration phenomenon in both the viewing configurations.

Figure 2:
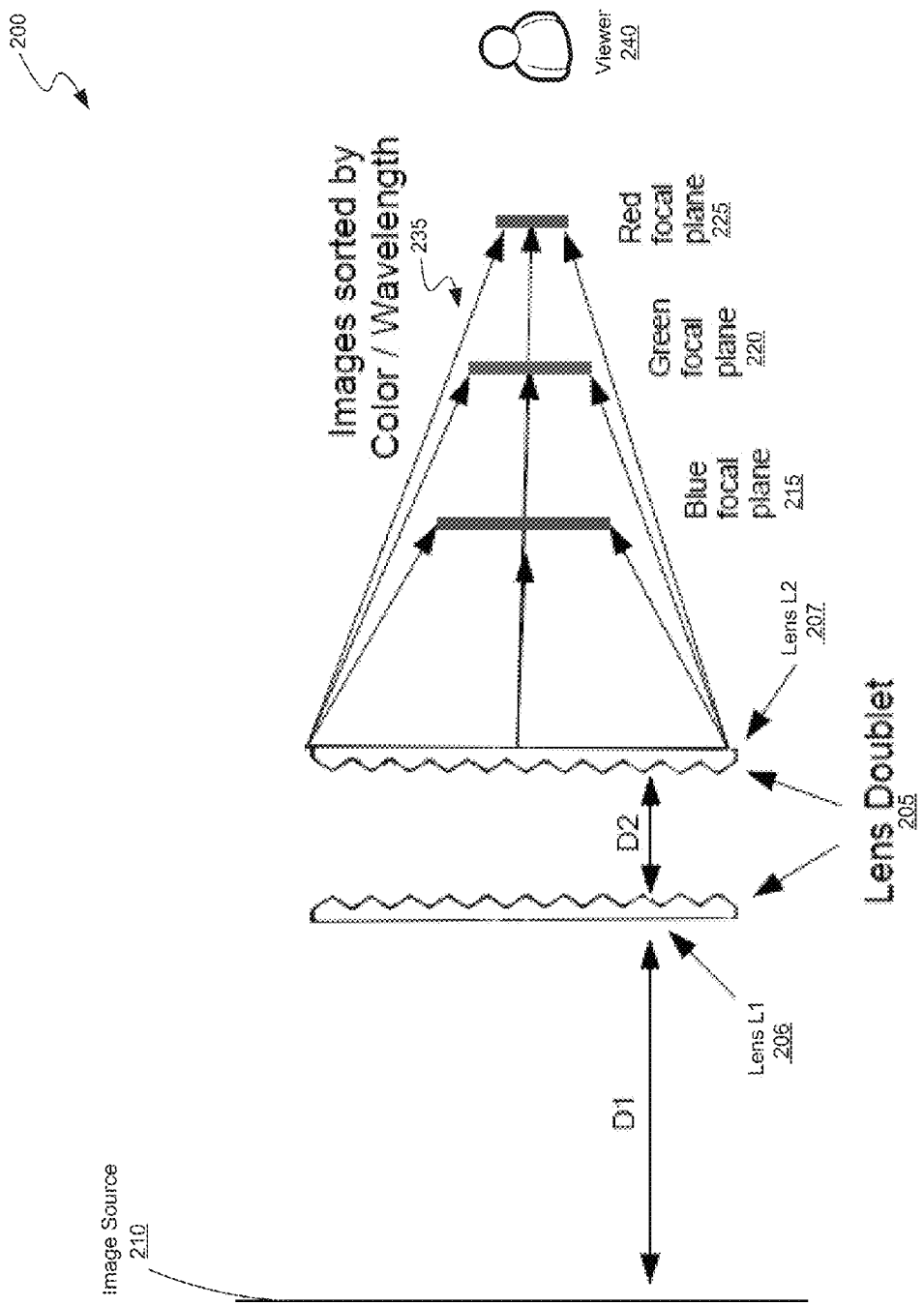
FIG. 2 is a block diagram of an aerial viewing configuration of a 3D imaging system, consistent with various embodiments.

FIG. 2 is a block diagram of an aerial viewing configuration of the 3D imaging system, consistent with various embodiments. In the aerial viewing configuration 200, the 3D imaging system includes an optical component 205 that generates a 3D spatial image from a 2D color-encoded content displayed by an image source 210. In some embodiments, the optical component 205 is similar to the optical component 105, e.g., exhibits the chromatic aberrations as described with reference to the optical component 105. The optical component 205 can be constructed using a pair of lenses (also referred to as a "lens doublet" 205), e.g., a pair of Fresnel lenses. In some embodiments, a Fresnel lens is a type of compact lens that has a large aperture and short focal length without the mass and volume of material that would be required by a lens of conventional design. A Fresnel lens can be made much thinner than a comparable conventional lens, in some cases taking the form of a flat sheet.

The lens doublet 205 includes two Fresnel Lenses, e.g., a first Fresnel lens 206 ("L1") and a second Fresnel lens 207 ("L2"), that are spaced apart and with their individual concentric grooves mutually facing each other. The lens doublet 205 receives light corresponding to a 2D image from an image source 210 on one side of the lens doublet 205 and generates or forms a 3D spatial image 235 of the 2D image on the other side of the lens doublet 205. The lens doublet 205 forms the 3D spatial image 235 in a space between the lens doublet 205 and a viewer 240. Since separate colors such as red, green, and blue have different wavelengths of light and because of the chromatic aberration of the lens doublet 205 the different colors cannot be focused at a single common point in the focal plane due to different refractive indices of the lens doublet. Different portions of the 3D spatial image 235 are formed at different distances from the lens doublet 205 based on the color of the corresponding portions, e.g., sorted by wavelength. For example, the lens doublet 205 focuses a portion of the 3D spatial image 235 that is of red color farthest from the lens doublet 205 (and nearest to the viewer 240) at a red focal plane 225, focuses the portion that is of blue color closest to the lens doublet 205 (and farthest to the viewer 240) at a blue focal plane 215, and focuses the portion that is of green color at a green focal plane 220, which is between the red and blue focal planes. The difference in distances between these various portions gives a perception of depth between these portions and hence, the perception of a 3D image.

Note that the above illustration of generation of a 3D spatial image using only a RGB color sequence is just an example. The color sequence of the 3D spatial image is not limited to the above color sequence; the color sequence can include various other colors, gradients of colors, hues of colors, etc., and each of the colors are focused at their appropriate focal planes.

The image source 210 is typically a device that is capable displaying a color-encoded 2D image, e.g., moving content, still content, or a combination. The image source can be an electronic 2D display such as LED or LCD monitors, plasma displays or alternatively by projection onto a 2D screen with DLP projectors, and lasers. The 2D image can be color-encoded using various techniques, e.g., using 3D imaging software. In some embodiments, the far background is a typically a mixture of dark blue and black textures, objects in the middle of the scene are green, and objects that are spatially formed in the front are red.

Figure 3:
FIG. 3 is an example 3D spatial image generated by the 3D imaging system in the aerial viewing configuration of FIG. 2, consistent with various embodiments.

FIG. 3 is an example 3D spatial image generated by the 3D imaging system in the aerial viewing configuration of FIG. 2, consistent with various embodiments. In the example 3D spatial image 300, the blue background 305 is focused farthest from a viewer, e.g., the viewer 240, the red/orange portion 315 is focused closest to the viewer 240 and the green object 310 is focused between the red and the blue objects.

Figure 4:
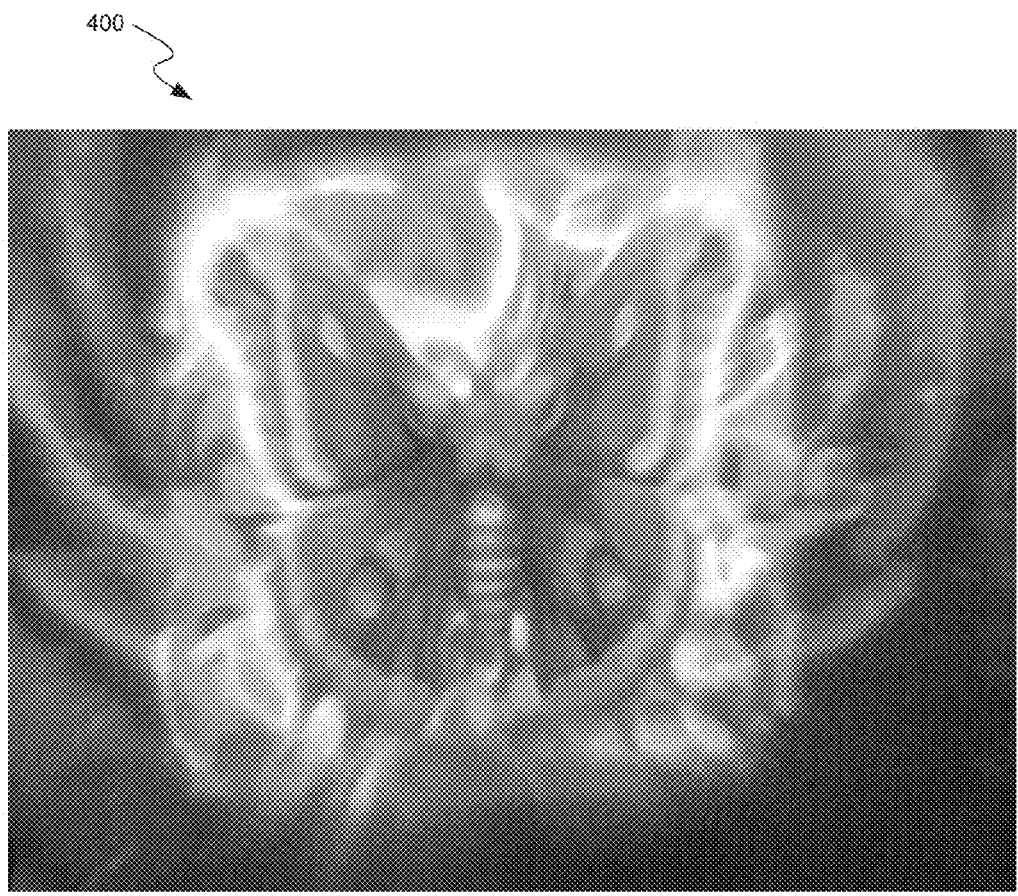
FIG. 4 is another example 3D spatial image generated by the 3D imaging system in the aerial viewing configuration of FIG. 2, consistent with various embodiments.

FIG. 4 is another example 3D spatial image generated by the 3D imaging system in the aerial viewing configuration 200 of FIG. 2, consistent with various embodiments. Again, various colors of the 3D spatial image 400 are formed at various distances from the viewer 240.

Referring back to the lens doublet 205 in the aerial viewing configuration 200, an f-number (f-stop) of a lens is the ratio of the lens's focal length to an aperture of the lens. In some embodiments, the lenses L1 and L2 have an identical f-number or an f-number within a specified range. For example, the lenses L1 and L2 each have an f-number of 1. In some embodiments, the focal length of each of the lenses is equal to the effective aperture thereof. In some embodiments, the f-number of each of the lenses L1 and L2 is between 1.5 and 0.5. With an f-number higher than 1.5, the generated 3D spatial image 235 can become blurry and with an f-number lower than 0.5, the manufacturing of the lens can be difficult, and an actual image can get projected instead of forming a 3D spatial image.

In some embodiments, the Fresnel lens grooves are preferred to have a pitch of about 0.5 mm. Although smaller pitches are available, for example, to about 0.05 mm, the integrity of the grooves appears to suffer with such smaller pitches. For additional consideration when selecting Fresnel lens, Fresnel lenses may be configured in positive or negative relief. With positive relief Fresnel lenses, the grooves extend above the level of the starting outer surface of the acrylic material from which they are formed. With negative relief, Fresnel lenses the grooves extend below the surface of the acrylic material. Positive relief Fresnel lenses are used in the opposite orientation sense as negative relief Fresnel lenses. In some embodiments, it is preferred to use positive relief Fresnel lenses.

A lens has an imaginary point referred to as the 2 F point, which is twice the focal length. An image source placed at approximately 2 F on one side of a lens causes a real-image to form in space at approximately 2 F on the other side of the lens. The exact location of the lens can be selected to increase or decrease the size and in addition to changing placement of the "floating" image. The lens doublet 205 is placed at a specified distance from the image source 210, e.g., at a distance D1 from the image source 210 to the lens L1. The lenses L1 and L2 are spaced apart by a distance D2 and with their grooves facing each other. The "real-image" is focused in front of Lens L2 at a focal plane D3 (not illustrated) assuming there is only one focal plane in an ideal situation. However, the real-image is generated as a 3D spatial image and therefore, has smoothly varying depth over various focal planes. In some embodiments, the distance D1 is between two to three times the focal length of the lens doublet 205. This produces a reduced-in-size real-Image floating in front of the lens L2, and due to the chromatic aberrations, the image focused at location D3 in front of the lens L2 is not planar but spatial in nature. By varying D1, the distance D3 at which the 3D spatial image floats from the lens L2 varies. For example, decreasing D1, by moving the lens doublet 205 closer to the image source 210, increases the distance D3. Likewise, increasing the distance D1, by moving the lens doublet 205 farther from the image source 210, decreases the distance D3.

In some embodiments, varying D1 also changes the size of the 3D spatial Image 235. For example, an increase of distance D1 can result in the decrease of the size of the 3D spatial image 235 at the distance D3, whereas a decrease in the distance D1 can lead to the magnification of the 3D spatial image 235 at the distance D3. Therefore, as D1 is decreased the 3D spatial image 235 is both magnified and moves closer to the observer, farther from the lens L2 and as D1 is increased, the 3D spatial image 235 is both reduced in size and moves away from the viewer 240 and closer to the lens L2. As stated earlier, D1 is preferably between two to three times the focal length of the lens doublet 205. This can produce a reduced-in-size real-image floating in front of the lens L2. When D1 is lower than 2 F (twice the focal length) of the lens doublet 205, a magnified-in-size real-image floats in front of the lens L2. For some cases, D1 may be reduced as low as 1.5 times the focal length of the lens doublet 205. The spacing D2 between the lenses L1 and L2 can typically be equal to or less than three-quarters the focal length of each one of the Fresnel lenses forming the lens doublet 205. The distance D2 can also be selected as large enough to avoid the moiré fringe effects with the floating 3D spatial image 235. In some embodiments, the distance D2 maintains a range in which there are intentional chromatic aberrations of images.

As mentioned above, the two lenses 206 and 207 together act as a single optical element. Each of the Fresnel lenses exhibits an f-number and focal length. However, acting as a doublet, the f-number can change, for example, to one-half that of the individual Fresnel lenses. In some embodiments, the size of the aperture of the lens doublet 205 should be smaller than the corresponding dimension of the image source 210. The image source is preferably at least 1.5 times the size of the Fresnel lenses. The specific size of the image source selected depends on various factors such as D1 and design of visual peripheral area, etc. In some cases, depending on content and desired visual effect, it may be desirable to tilt one or more of the Fresnel lenses. Tilting one or more of the Fresnel lenses may add to the spatial nature of certain content.

In some embodiments, changing a size of an image element within the 2D image content, along with changing wavelength, changes the apparent depth of the image element. In optical terms, the image focused in front of the lens L2 is a real-image. The 2D image on the image source 210 is inverted as it passes through the lens doublet 205 and projected as a real-image. The inverted image (3D spatial image 235) viewed in front of the lens L2 appears to be floating in free space. To compensate for this inversion and correctly display this image as intended, the spectrally encoded 2D image on the image source 210 is inverted in relation to its intended viewing orientation, as to be correctly displayed when viewed as the floating real-image (3D spatial image 235). Since the foremost portions of the 3D spatial image 235 float in free space in front of the viewing window, e. g., in the space between the optical component L2 and the viewer 240, window violations occur when a visual element moves off the outer side of the viewing window, eliminating the appearance that the imagery is floating. The bounding of foremost images may be applied to the aerial viewing configuration 200, to prevent window violations. Foremost image elements may be bound so they may not enter and exit from the viewing window to the sides, top or bottom of the viewing window. Image elements farthest from the viewer 240 and the dark blue/black background, typically appearing behind the viewing window and therefore not susceptible to window violations, do not need such bounding.

Figure 5:
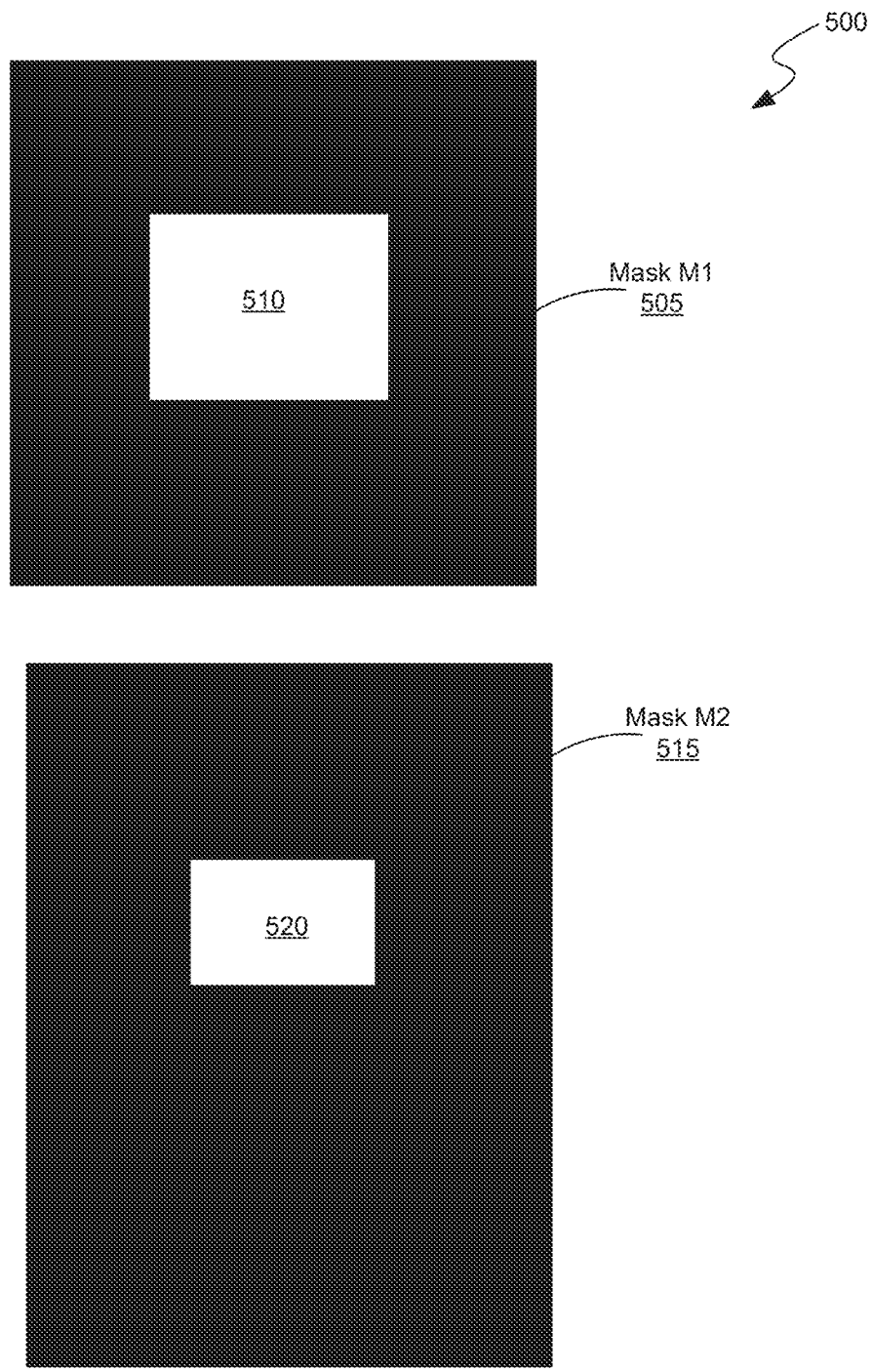
FIG. 5 is a block diagram of a mask system used with the 3D imaging system, consistent with various embodiments.

FIG. 5 is a block diagram of a mask system used with the aerial viewing configuration of the 3D imaging system, consistent with various embodiments. The aerial viewing embodiment 200 of FIG. 2 can use a mask system 500 for enhancing the spatial perception of the 3D spatial image 235. The mask system includes a first mask M1 505 and a second mask M2 515. The masks can be used to reduce the flatness cues. The front of the mask, e.g., of mask M1, can function as a cover for the lens doublet 205. The mask M1 includes an aperture or an opening 510 and the mask M2 includes an opening 520 through which light from the image source 210 passes out of the lens doublet 205. The mask M1 is placed so that the edges of the opening 510 cover the edge of the lens L2, that is, the Fresnel lens closest to the viewer 240. The mask M2 is placed in front of the mask M1 and towards the viewer 240 with a gap G1 605 between mask M1 and mask M2, e.g., a gap of few inches, which is illustrated at least with reference to FIG. 6.

Figure 6:
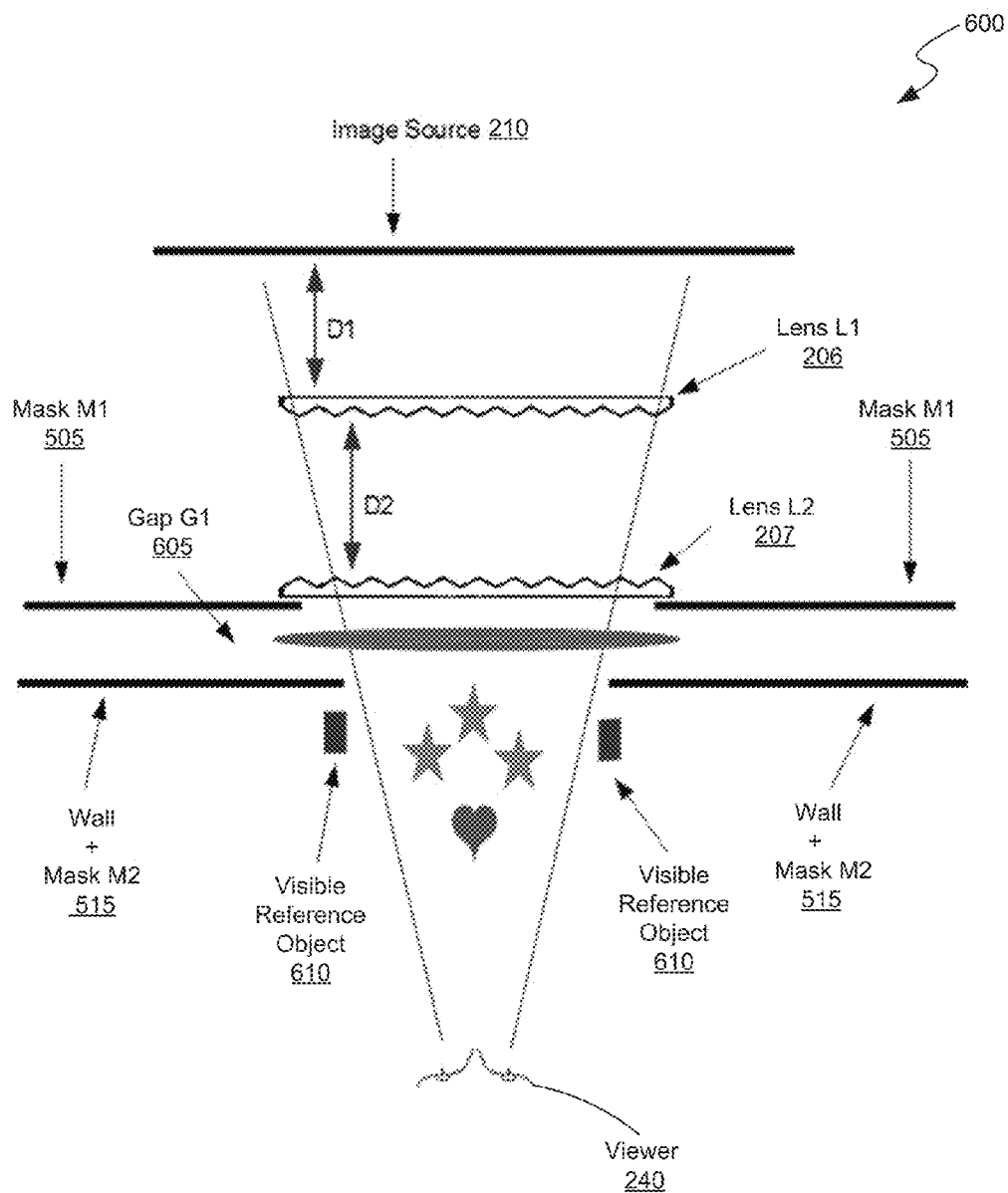
FIG. 6 is a top view of the aerial viewing configuration of the 3D imaging system, consistent with various embodiments.

FIG. 6 is a top view of the aerial viewing configuration of the 3D imaging system, consistent with various embodiments. The gap G1 605 helps dislocate the flat plane of the lens L2 in the mind of the viewer 240, that is, reducing flatness cues. The smaller size of the aperture of mask M2 compared to the aperture of Mask M1 also allows different parts of the peripheral background of the 3D spatial image 235 to come in and out of the view, as the view or the viewer 240 moves. This enhances the spatial realism of the display. The size of the gap G1 605 can vary based on various factors, e.g., based on the size of the image source 210, size of the lens doublet 205, distance D1, visual content being displayed, desired visual effect. In some embodiments, the mask M2 typically is a wall with a window through which 3D spatial images are projected outward. The aperture on the mask M2 is slightly smaller than the aperture on rear mask M1.

The openings can be of any shape, e.g., rectangular, ellipsoid, an irregular border pattern, hexagonal, depending on shape of the viewing window on the wall on which the mask and the lens doublet 205 is installed. The opening 510 may be of one shape and the opening 520 may be of a different shape. In some embodiments, the edges of front mask M2 may be made of a gradated material varying from transparent to opaque, specifically with the opaque area covering the outer side edges of the mask M2, in a manner which allows the gradated transparency area become more transparent towards the center of the viewing window.

The masks may be made of any suitable material, e.g., wood, acrylic, foam core. The masks can be of any color and finish. For example, the masks can be black and have a matte finish. In some embodiments, the mask M2 color finish can match with the wall at which the 3D imaging system is installed. In some embodiments, a visible reference object 610 such as a picture frame, drapes, a window frame, and a door frame, may also be placed in front of the aperture on Mask M2, near the projected floating spatial image. The visible reference object 610 can help establish a distance between the viewer 240 and the projected 3D spatial image.

In some embodiments, a visible reference object 610 is a physical object placed at or near the frontal region of the 3D spatial image 235 that is closest to the viewer 240. In the aerial viewing configuration, the visible reference object 610 can be placed approximately at the frontal projected point of the 3D spatial image 235. However, in some embodiments, depending on content and application, the visible reference object 610 may be as near as possible, slightly in front of or slightly behind the foremost projected portion of the 3D spatial image 235 (such as the red focal plane) in relation to the viewer 240. The visible reference object 610 will not usually overlap with the generated 3D spatial imagery, unless the also functioning as a silhouette, however motion parallax between the spatial imagery and the visible reference object 610 will occur without occlusion. In the case of the aerial viewing configuration, the motion parallax can help enhance the impression the floating spatial imagery exists within the same environment as the viewer 240.

Figure 7:
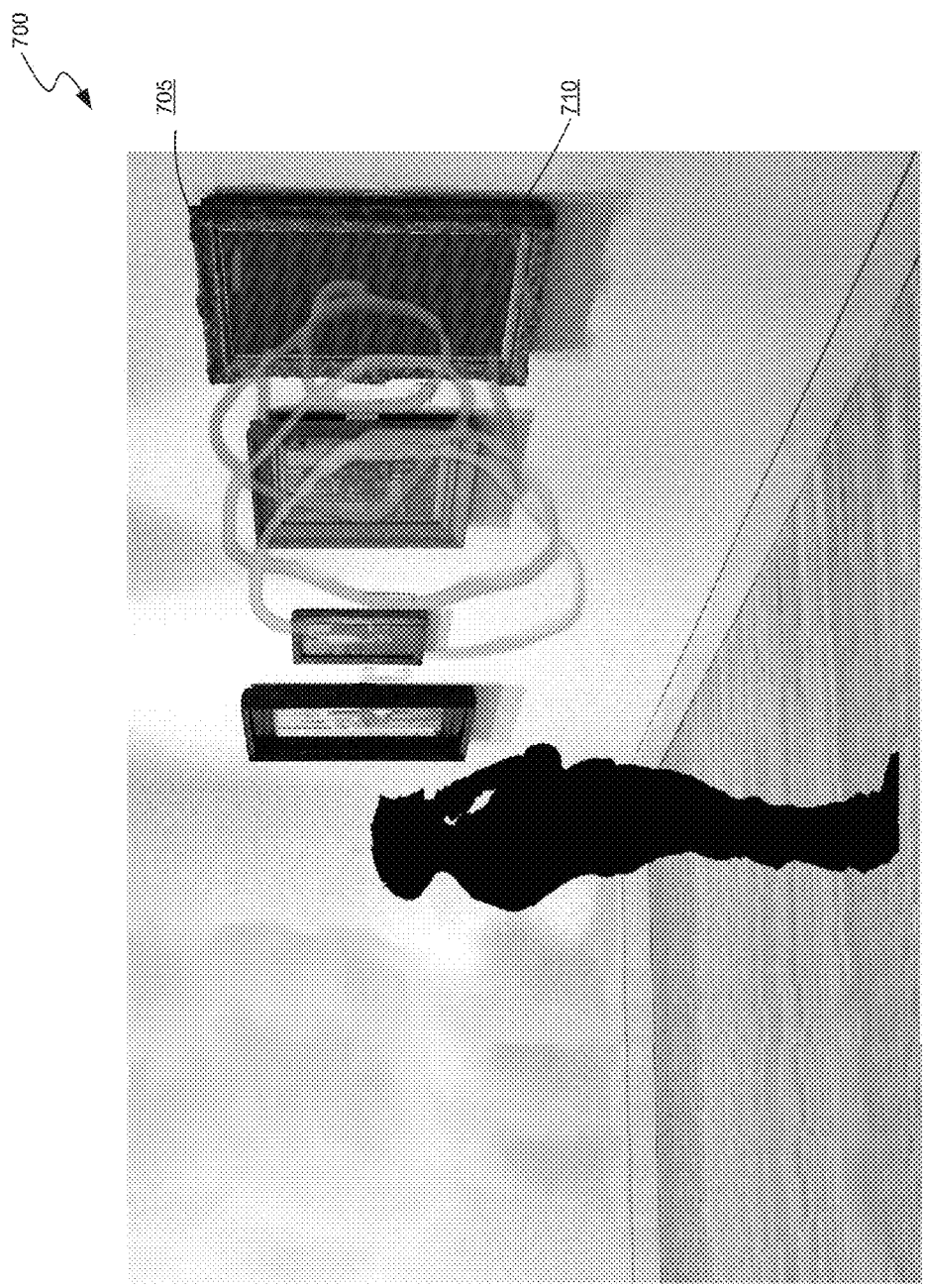
FIG. 7 is an example of an artist's rendition of a viewing setting for the aerial viewing configuration, consistent with various embodiments.

FIG. 7 is an example 700 of an artist's rendition of a viewing setting for the aerial viewing configuration, consistent with various embodiments. In the example 700, a picture frame 705 mounted on a wall is used as a visible reference for the lens doublet 710 installed in the wall. In some embodiments, the lens doublet 710 is similar to the lens doublet 205 of FIG. 2. The wall can also act as the front mask M, and the opening in the wall as an aperture through which the 3D spatial image is projected.

Figure 8:
FIG. 8 is another example of a viewing setting for the aerial viewing configuration, consistent with various embodiments.

FIG. 8 is another example 800 of a viewing setting for the aerial viewing configuration, consistent with various embodiments. In the example 800, the doors in a miniature model house act as a visible reference and the opening around the door acts as an aperture. The extended open doors and the doorframe around the aperture opening clearly establishes the distance from the skeleton to the viewer.

In some embodiments, silhouettes are physical objects which add real-world occlusion and motion parallax from the observer's environment to the 3D spatial imagery, enhancing spatial impression by working in conjunction with the window parallax and pseudo-motion-parallax. A silhouette can make use of a psychological vision cue known as occlusion (interposition), which means that portions of a more distant object may be obscured by objects in the foreground. Additionally, a silhouette can make use of a physical cue known as motion parallax, where movement of the observer allows them to view different portions of a three-dimensional scene. A silhouette is also capable of exhibiting motion parallax and occlusion in a plurality of directions when used in combination with the 3D spatial image.

Occlusion is a psychological depth due, which is typically already present in the within the spatial image, as visual elements focused at different depths within a scene often overlap and therefore, occlude the visual element which is behind them in relation to the observer. Motion parallax is a physical cue associated with real 3D scenes which imparts to the brain the perception that a viewed scene is indeed 3D. When the observer moves from side to side (up and down too, as with head motion), the silhouette can offer significant motion parallax and occlusion in relation to the 3D spatial image, enhancing the depth, and overall dimensionality of the real-image illusion.

If properly placed, a silhouette may also function as a visible reference, as described earlier. In many cases, the silhouette also functions as a visible reference, typically when the size, shape and placement of a silhouette allows a specific area of the silhouette to be placed near the front focal plane of the spatial image, e.g., a focal plane closest to the viewer. More specifically, a specific area of the silhouette is to be placed near the front focal plane of the spatial image to function as a visible reference.

A silhouette can function as an environmental cue adding visual overlap, occlusion and observer motion parallax effects from the viewer's environment over the synthetic spatial imagery. The 3D spatial image 235 may be made to appear more realistic if certain visual features appear to match the surrounding environment. The 3D spatial image 235 emits light which may be cast onto the surface of a silhouette or the visible reference object 610. The light which is cast onto a silhouette or visible reference object 610, referred to as shadows of light, may appear to follow the motion of a visual element within a 3D spatial image in a manner similar to an actual shadow.

A silhouette may be any device that affects the transmission of light from the spatial scene to the observer, and may be opaque, reflective, translucent, clouded, or transparent with reflectivity, color, tint, pattern, distortion, and/or any combination thereof. A silhouette may have any shape; and be positioned by any means, such as by attachment to the wall, or by suspension in position independent of the wall, placed on a pedestal, fixedly or adjustably with respect to distance from the observer's eyes and/or the extent of the obstruction of the observer's view. A silhouette, however, should be shaped to be visible against parts of the spatial scene being viewed. A silhouette should be further shaped to allow the desired amount of visibility of the spatial scene being viewed in combination with the silhouette. A silhouette will generally have visual features which will continually overlap and un-overlap with the spatial imagery behind them, the visually overlapping features can be opaque, transparent or semi-transparent.

Figure 9:
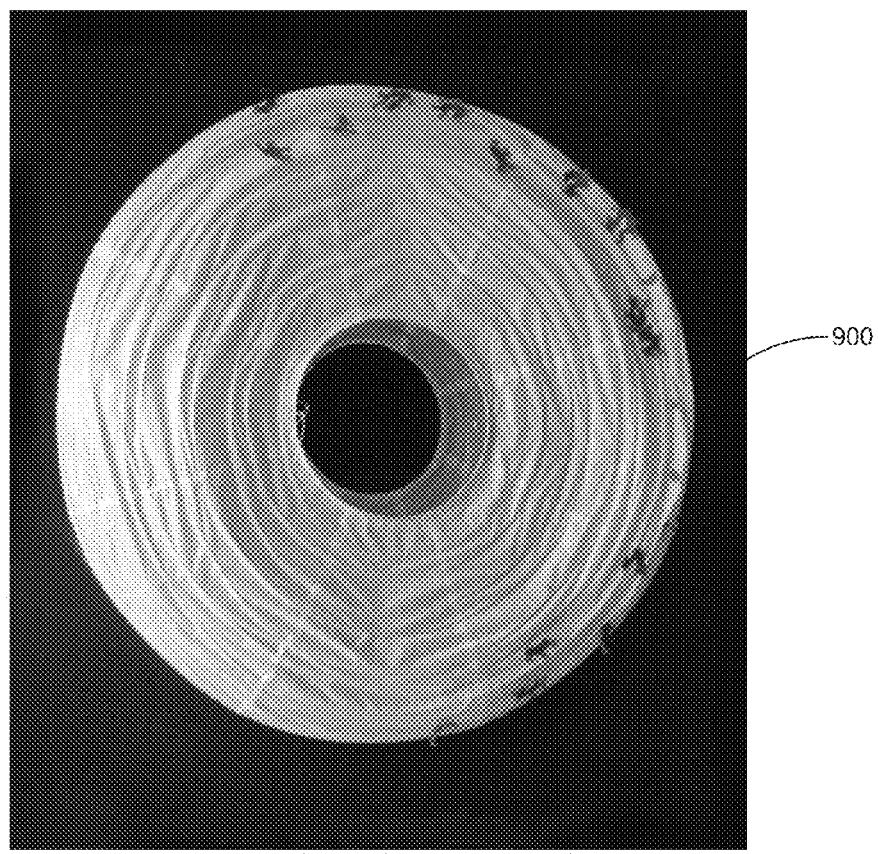
FIG. 9 is an example of a silhouette used in the aerial viewing configuration, consistent with various embodiments.
Figure 9:
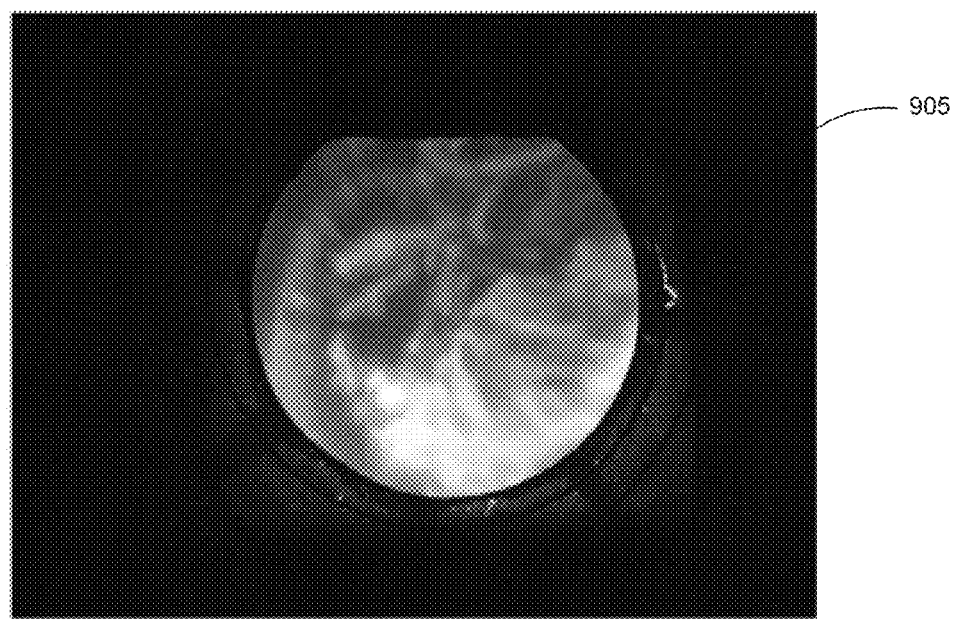

FIG. 9 is an example of a silhouette used in the aerial viewing configuration, consistent with various embodiments. The picture 900 depicts a silhouette, e.g., a paper lantern. As described above, silhouette adds occlusion and motion parallax cues, blocks outer edges of the lens and serves as the visible reference for floating imagery. The picture 905 illustrates the floating spatial image viewed within Silhouette. The tears in the paper lantern add occlusion and motion parallax cues, and the front lantern hole acts as a the visible reference. The semi-transparent material of the paper lantern adds additional occlusion and motion parallax cues. In some embodiments, a specific type of the paper lantern, e.g., size, is a combination of D1, the size of the floating 3D spatial image and other such related factors.

Figure 10A:
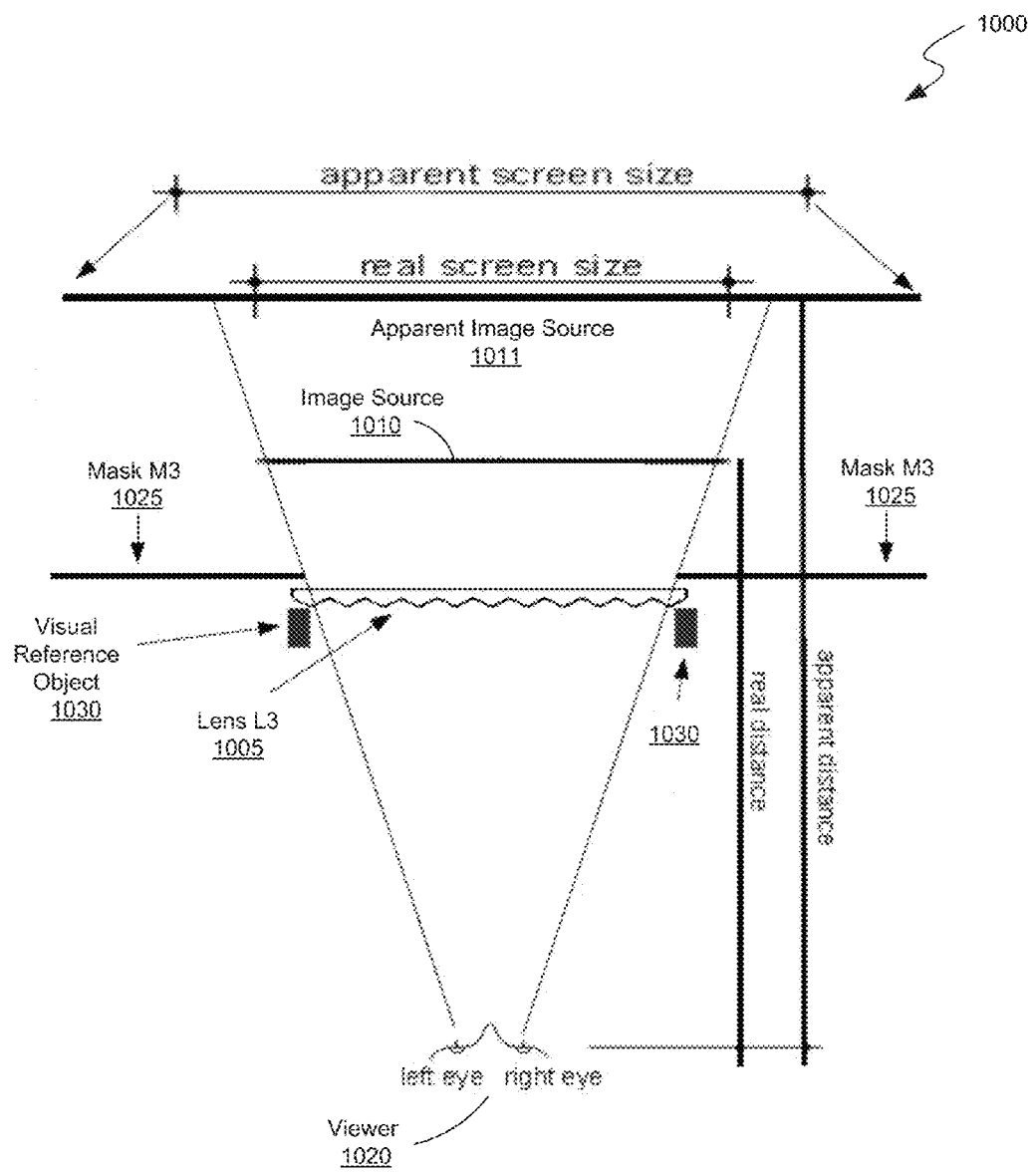
FIG. 10A is a block diagram an infinity viewing configuration of the 3D imaging system, consistent with various embodiments.
Figure 10B:
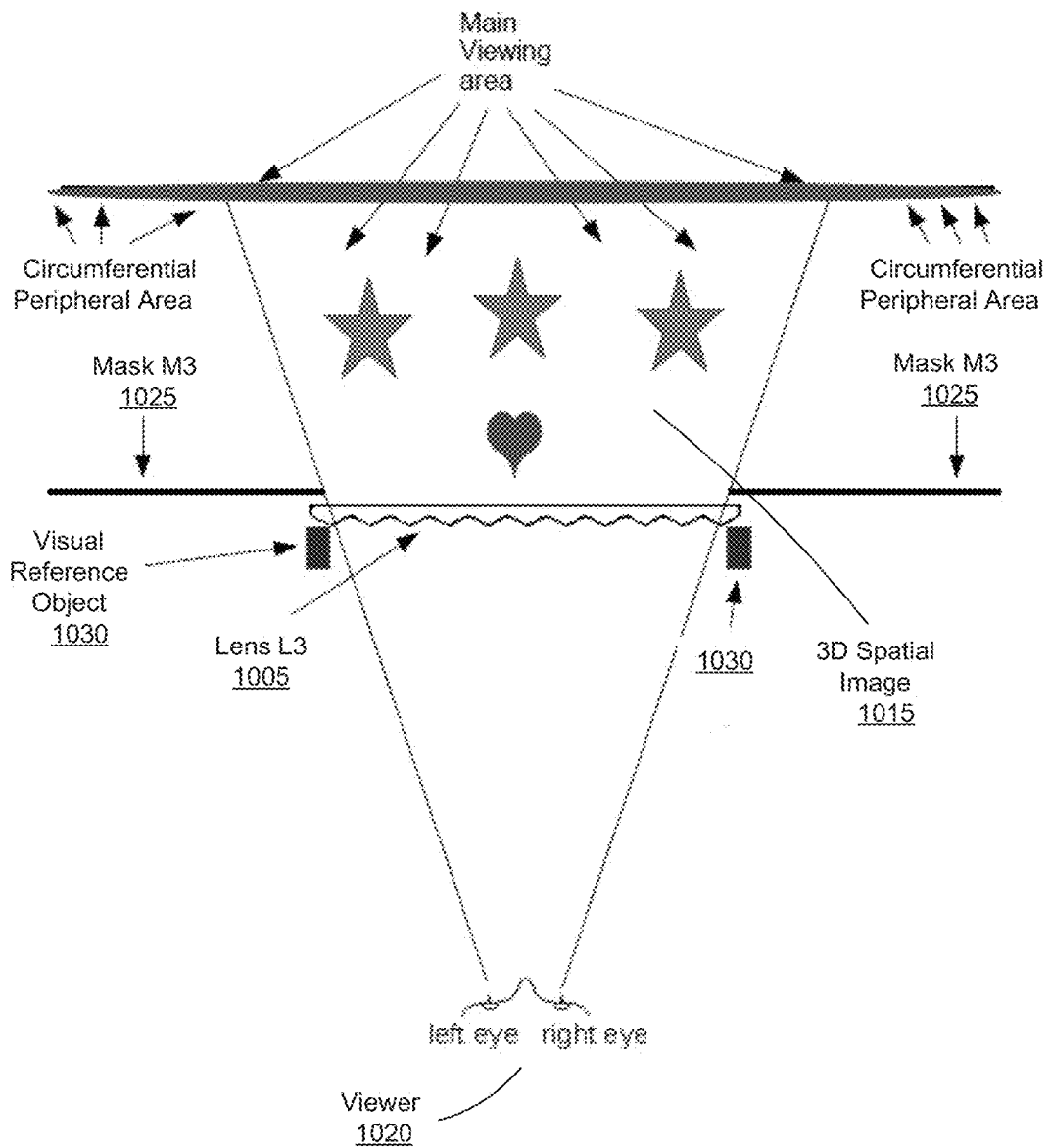
FIG. 10B is a top view of the infinity viewing configuration of the 3D imaging system, consistent with various embodiments.

FIG. 10A is a block diagram an infinity viewing configuration of the 3D imaging system, consistent with various embodiments. In the infinity viewing configuration 1000, the 3D imaging system includes a single optical component 1005, e.g., a Fresnel Lens ("L3"), that receives light corresponding to a 2D image from an image source 1010 placed on one side of the lens L3 and generates a 3D spatial image 1015, which is illustrated in FIG. 10B, on the same side of the lens L3. If the lens L3 is installed on a wall, then the position in the wall at which the lens L3 is installed can act as a viewing window 1035, and the 3D spatial image 1015 is formed right behind the viewing window 1035. In the infinity viewing configuration 1000, the 3D spatial image 1015 does not float in free space in front of the viewing window between the optical component 1005 and the viewer 1020 as with the aerial viewing configuration 200.

However, in the infinity viewing configuration 1000 can produce 3D spatial images at a much greater distance than the aerial viewing configuration, in terms of images in the spatial scene spanning from great distances away from the viewer 1020 to very close to the viewer 1020 (up until the lens L3). The infinity viewing configuration also has a much larger field of view than the aerial viewing configuration 200, due to which the viewer 1020 has more freedom to change his/her position in viewing the 3D spatial image 1015. Since the spatial imagery does not float in free space in front of the viewing window 1035, e.g., in the space between the optical component L3 and the viewer 1020 as with the aerial viewing embodiment, window violations do not occur when a visual element moves off the outer side edges of the viewing window 1035. Therefore, there is more freedom of movement for specific visual elements in the 2D image from the image source, when producing 2D content for the infinity viewing configuration 1000.

With the aerial viewing configuration 200, chromatic aberrations cause differently colored elements of the 3D spatial image 235 to focus at different points in space. With the infinity viewing configuration 1000, light does not focus behind the lens L3 in the same manner. Specifically, the virtual-image produced by the infinity viewing configuration 1000, may appear to be focused at between the lens L3 and optical infinity, as illustrated in FIG. 10A. FIG. 10A is a top view of the infinity viewing configuration of the 3D imaging system, consistent with various embodiments. In some embodiments, the image source 1010 is similar to the image source 210 of FIG. 2. The image source 1010 has a color-encoded 2D image, but with more flexibility for moving the front and middle imagery off to the side of the viewing window 1035. This is because the 3D spatial image 1015 is viewed as a virtual-image. The 3D spatial image 1015 in the infinity viewing configuration 1000 is viewed as if looking out a window, with all imagery behind the window.

The lens L3 is placed in front of the image source 1010 at a distance D4. In some embodiments, D4 is approximately the focal length of lens L3, or slightly lesser. The specific placement can depend on visual content and optical effect desired. The lens L3 can produce a background image, e.g., a background portion of the 3D spatial image 1015 at or near optical infinity, when then image source 1010 is viewed through the lens L3. In some embodiments, the size of the lens L3 should be smaller than the corresponding dimension of the image source 1010. The image source 1010 is preferably at least 1.5 times the size of the lens L3. The specific size of the image source selected depends on various factors such as D4 and design of visual peripheral area, etc. The focal length of the lens L3 can be between F 1.5 and F 0.5. The grooves of the lens L3 have a specified pitch, e.g., 0.5 mm. The lens L3 is mounted on a mask M3 1025, which can be similar to the masks M1 or M2 of FIG. 2, with an aperture slightly smaller than the lens L3, e.g., just covering the edges of lens L3. Typically, a visual reference object 1030, such as a picture frame or a window frame can cover the outer edges of lens L3.

When the image source 1010 is viewed through the lens L3, the image source 1010 is magnified and appears to be at a distance much greater than it actually is. For example, the image source 1010 appears to be at a distance D5 from the lens L3. That is, the apparent image source 1011 is at the distance D5 and is a magnified version of the image source 1010.

As with the aerial viewing configuration 200, different color portions of the 2D image focuses at different distances from the lens L3. For example, as depicted in 3D spatial image 1015, red focuses the closest to the viewer 1020, green in the middle and dark blue mixed with black is the far background. Unlike the aerial viewing configuration 200, which produces a real-image floating in front of the lens doublet 205 of FIG. 2 and the viewing window 1035, the image viewed though lens L3 is, in optical terms, a virtual-image, appearing behind the viewing window 1035. This allows imagery to appear at apparent distances between several feet away from the viewer 1020 to a larger distance from the viewer 1020.

Also, unlike the aerial viewing configuration 200, the 2D color-encoded image on the image source 1010 for the infinity viewing configuration 1000 may not have to be inverted, as it appears upright (uninverted) when viewed though lens L3. The background and image elements receding into the far distance can be perceived as if they are at or near optical infinity. Perceived distance depends on how close to the focal length of the lens L3 the image source 1010 is. The distance D4 can be varied to suit different content and desired effects. When the image source 1010 is too far past the focal length, the image can distort or degrade. In some embodiments, the image source 1010 is placed at the focal point of the lens L3 or slightly closer than the focal point. This can optically place the background portion of the 3D spatial image 1015 at or near optical infinity.

If an image source 1010 is placed at a distance D4 less than the focal length of the lens L3, the viewer 1020 will perceive that image to be closer than at infinity. Typically, the image source 1010 is to be placed at a distance D4 to the lens, no closer than 65% of the focal length. In a manner similar to the aerial viewing configuration 200, placing the image source 1010 at various distances relative to the focal length, due to chromatic aberrations, different wavelengths will appear at varying depths. The 3D spatial image 1015 can be formed right behind the viewing window 1035 but not float in free space between the viewing window 1035 and the viewer 1020.

As with the aerial viewing configuration 200, changing a size of an image element within a scene in the 2D content, along with changing the wavelength can change apparent depth. However, the infinity viewing configuration 1000 is capable of producing images at a much greater distance from the viewer 1020 than the aerial viewing configuration 200. Since the 3D spatial image 1015 in the infinity viewing configuration 1000 does not appear at a depth closer to the viewer 1020 than the viewing window 1035, the bounding of foremost images as applied to the aerial viewing configuration 200, may not be applied. Images may enter and exit from the viewing window 1035 to the sides, top or bottom of the viewing window 1035 without causing any reduction in the spatial perception of the 3D spatial image 1015.

In some cases, depending on 2D content and desired visual effect, it may be desirable to tilt the lens L3. Tilting the lens L3, may add to the spatial nature of certain content. In some embodiments, due to the extra peripheral imagery, the dark blue/black background in the 2D image displayed on the image source 1010 surrounds the middle and frontal objects more than is viewed when looking through the viewing window 1035. More or less of the background come into and out of view through the window as the viewer 1020 moves. The same thing happens when looking out a real window, due to parallax by observer motion, which is referred to as window parallax. This adds to the spatial realism of the display. The viewing window 1035 also hides the edges of the background, so there is no abrupt change at the edges. Perceived spatial depth is enhanced because the background appears to continue indefinitely behind the side edges of the viewing window 1035.

Figure 10C:
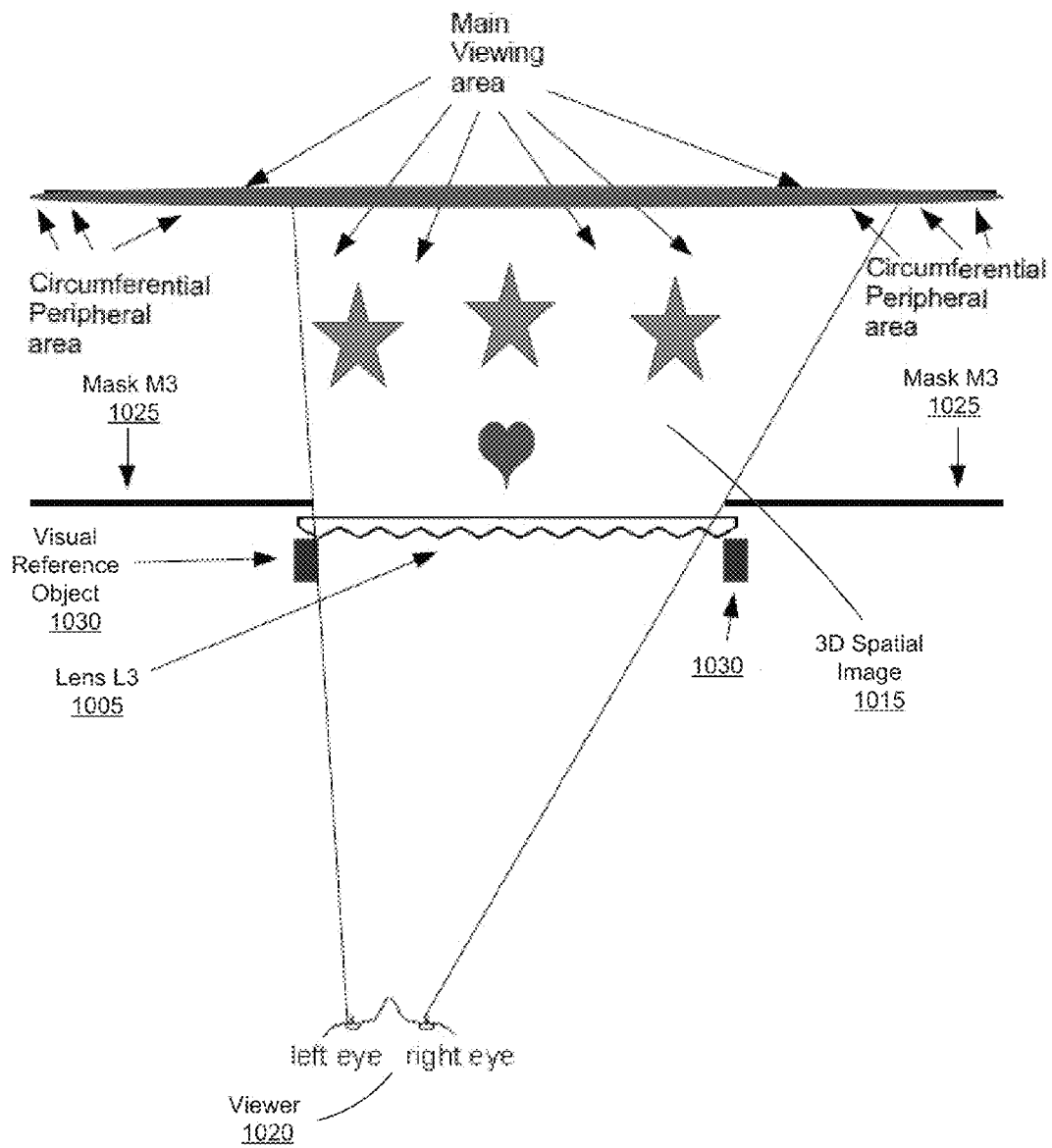
FIG. 10C is another top view of the infinity viewing configuration illustrating window parallax phenomenon, consistent with various embodiments.

Referring to FIG. 10B, the viewer 1020 stands in front of the viewing window 1035 seeing red objects just on the other side of the viewing window 1035, green in the middle, and blue/black in the far distance. The Blue/Black background can be perceived as extremely distant, e.g., many miles. This is because the background imagery is collimated or quasi-collimated and appears at or near optical infinity. The circumferential peripheral area is out of the observer's sight when looking at the viewing window 1035 in the center. As the viewer 1020 moves, more or less of the peripheral scene comes in and out of view, just as if looking out a real window, e.g., as illustrated in FIG. 10C. FIG. 10C is another top view of the infinity viewing configuration illustrating window parallax phenomenon, consistent with various embodiments. In the FIG. 10C, the circumferential peripheral area comes into the view as the viewer 1020 moves.

Figure 11A:
FIG. 11A is a picture of an example viewing setting of the infinity viewing configuration of the 3D imaging system, consistent with various embodiments.
Figure 11B:
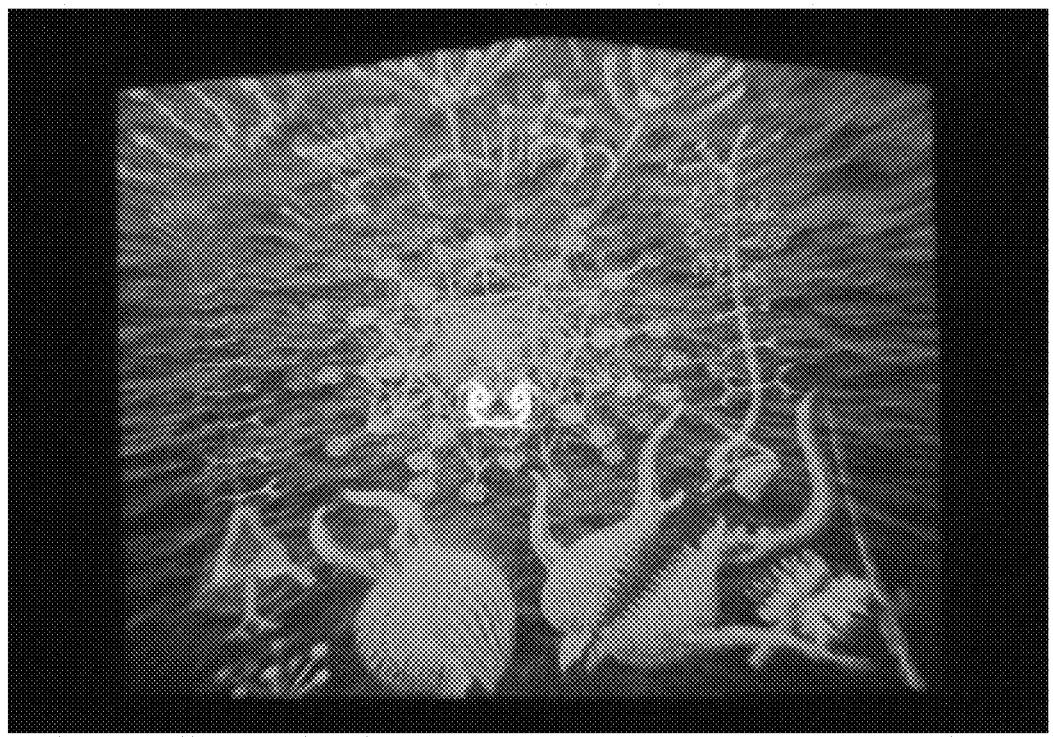
FIG. 11B is a picture of a 3D spatial image generated by the infinity viewing configuration of the 3D imaging system of FIG. 11A, consistent with various embodiments.

FIG. 11A is a picture of an example viewing setting of the infinity viewing configuration of the 3D imaging system, consistent with various embodiments. In the example view setting of FIG. 11A, the optical component, e.g., Fresnel lens L3, is mounted on a wall with the grooves facing the viewer. The edges of the lens L3 is covered with a picture frame, which acts as a visual reference object. The image source is behind the wall. FIG. 11B is a picture of a 3D spatial image generated by the infinity viewing configuration of the 3D imaging system of FIG. 11A, consistent with various embodiments.

The 3D imaging system, either in the aerial viewing configuration 200 or the infinity viewing configuration 1000, generate 3D spatial images of the color-encoded 2D images from an image source. To place the images to at varying apparent depths, the 2D images displayed on the image source need to be encoded with spatial information. Color/wavelength encodes the apparent distance to the observer. The following paragraphs describe generation of the color-encoded 2D content.

Figure 12:
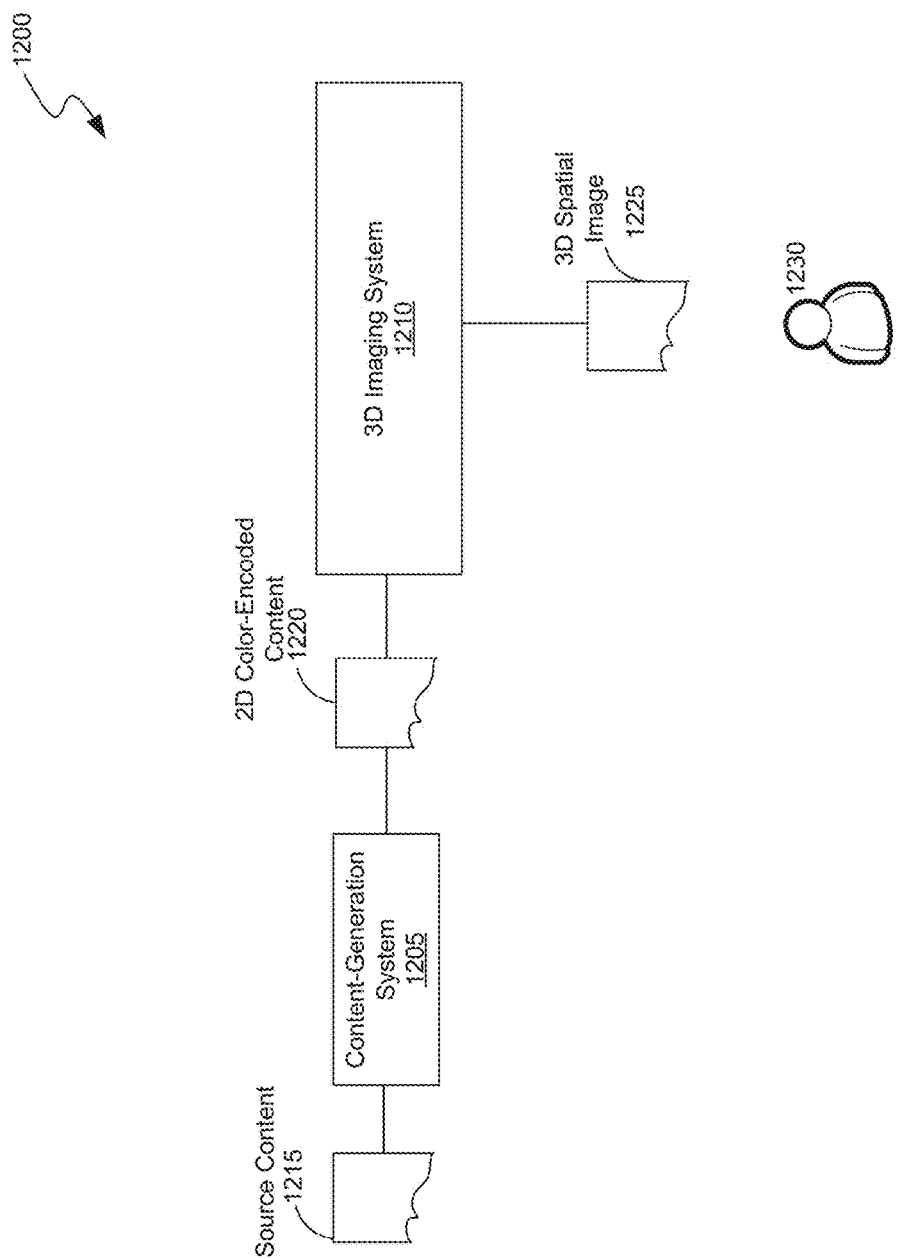
FIG. 12 is a block diagram of an environment in which the disclosed embodiments can be implemented, consistent with various embodiments.

FIG. 12 is a block diagram of an environment in which the disclosed embodiments can be implemented, consistent with various embodiments. The environment 1200 includes a content-generation system 1205 that is used to generate 2D color-encoded content 1220, and a 3D imaging system 1210 that is used to generate a 3D spatial image 1225 from the color-encoded content 1220. In some embodiments, the 2D color-encoded content 1220 is similar to 2D color encoded content used in the aerial viewing configuration 200 of FIG. 2 and in the infinity viewing configuration 1000 of FIGS. 10A and 10B. The content-generation system 1205 can generate the 2D color-encoded content 1220 from source content 1215, e.g., images or videos captured using various input devices such as cameras. In some embodiments, a user, e.g., content creator, can directly generate the 2D color-encoded content 1220 using CGI techniques in the content-generation system 1205. In some embodiments, the content-generation system 1205 can generate the 2D color-encoded content 1220 based on a combination of the CGI and source content 1215. Layered composite imagery in conjunction with wavelength/color dependent spatial encoding can provide control over spatial perception of local visual features of images and objects within a 3D scene viewed as a spatial image. The content-generation system 1205 can implement a 3D modeling software or other custom computer code to create a 3D scene or any other form of the 2D color-encoded content 1220. A 3D scene can consist of images, data representing 3D models, data such as lighting and fog effects data, shader code etc. A 3D scene can also be scene captured with a camera, capture device or sensor, (e.g., Kinect from Microsoft or Lytro from Lytro) which also provides depth information. A perspective of the 3D scene is rendered as a 2D color-encoded content 1220 to be viewed as a 3D spatial image 1225.

The source content 1215 may or may not include depth information, e.g., z co-ordinates on a 3D scale (x, y, z). If the source content 1215 includes the depth information, then the content-generation system 1205 can automatically analyze the source content 1215 and encode the specific portions of the source content 1215 with specific colors based on the depth information of the specific portions to generate the 2D color-encoded content 1220. As described earlier, for both viewing configurations, different portions of a spatial image appear to be focused at different points in space due to chromatic aberrations of the optical component, e.g., Fresnel Lenses. For example, red image elements appear in the front, green image elements appear in the middle, and blue image elements appear in the background. Accordingly, the content-generation system 1205 can encode portions of the source content 1215 that are to be formed in the foreground or closest to a viewer 1230, e.g., that has least depth among other portions, with red, portions that are to appear in the far background from the viewer 1230, e.g., portions that have largest depth, with blue, and encode portions that are to appear in between the background and the foreground, e.g., with depth between that of the portions of foreground and background, with green.

In embodiments where the source content 1215 does not include the depth information, a user can access the source content 1215, e.g., using an image processing software implemented by the content-generation system 1205 and assign a color to one or more portions of the source content 1215 according to relative distances the portions have to be formed in the 3D spatial image 1225.

When the 2D color-encoded content 1220 is imaged using the 3D imaging system 1210, the 2D color-encoded content 1220 is generated as a 3D spatial image 1225 in which different portions of the source content 1215 are formed at different distances from the viewer 1230, thereby providing a perception of the depth in the generated 3D spatial image 1225. The 3D imaging system 1210 can be implemented in the aerial viewing configuration 200 or the infinity viewing configuration 1000. At the minimum, the 3D imaging system 1210 has at least one optical component, e.g., a Fresnel lens such as L1, L2 or L3. The 3D imaging system 1210 can also have an image source, e.g., image source 210 or 1010, which displays the 2D color-encoded content 1220. The 3D imaging system 1210 can also have a mask system, a visual reference, a silhouette etc.

Note that the RGB color sequence used for encoding the source content is just for illustration purposes. Various other color sequences can be used for encoding the source content to encode the apparent distance to the viewer 1230. In some embodiments, various other factors associated with the source content can also be varied to change the apparent distance. For example, by varying the hue in conjunction with x, y placement, size, shading, luminance, and various monoscopic depth cues of the portions of the source content, the portions of the source content can be placed anywhere in a spatial scene. Similarly, by modifying hue, luminance, shading, contour, edge outlines, and other monoscopic depth cues, over the surface of an individual object in a spatial scene, the object can have individual parts of it focused at different points in space, closer or farther from the viewer 1230.

The above can be accomplished through the content-generation system involving linear color gradients, color ramps, graphics shaders, image scaling, image rotation, (x, y) image placement, layered image compositions, image transparency, alpha compositing, image colorization and motion paths, in addition to other image processing techniques. In addition to hue/color and luminance, forced perspective techniques and 2D Depth cues such as relative size, shading and shadows may also encode depth information onto the encoded image. In some embodiments, generation and control of 2D depth cues are typically provided by various computer graphics modeling and rendering applications. In some embodiments, the content-generation system 1205 includes a shader tool that is used to shade an image, produce special effects, add levels of color to an image or do video post-processing. The shader tool may be programmed to shade the source content according to distance from a real or virtual camera, e.g., which can be provided as depth information by the real or virtual camera. In some embodiments, the content-generation system 1205 implements a colorizer tool that is used to add color information to image elements, which allows spatial encoding of the 2D image with wavelength/color encoded spatial information. The colorizer tool can be used in addition to or as an alternative to the shader tool to colorize the object.

In some embodiments, the content-generation system 1205 provides the content creator with depth information, e.g., information regarding distance from a virtual camera to objects within a virtual scene, and/or derives the depth information, e.g., information regarding distance from a real camera to objects within a real scene, based on the information provided by the image capture devices, e.g., Kinect or Lytro, used to capture the source content 1215.

Typically, in 3D computer graphics, a depth map (also known a as a "z-map") is an image or image channel that contains information relating to the distance of the surfaces of scene objects from a viewpoint. The term is related to and may be analogous to depth buffer, z-buffer and z-depth. The "z" in these latter terms relates to a convention that the central axis of view of a camera is in the direction of the camera's z-axis, and not to the absolute z-axis of a scene. The depth map is a picture where "x" and "y" represent space, and the color of each pixel represents its height, "z," (either from the plane or from a virtual camera). These images are usually grayscale with white being closest and black being furthest away. Sometimes the ordering may be reverse, with black being closest and white being furthest away. The grayscale palette can be replaced by mapping greyscale information to a modifiable reference gradient, resulting in the wavelength/color spatially encoded image. Similarly, depth maps produced by image capture devices, e.g., Kinect, Lytro cameras or a stereo camera in conjunction with conversion software, can be used to shade or colorize the imagery, by mapping the depth maps to modifiable reference gradients.

As described earlier, the shader tool may be programmed to provide color based spatial encoding to an object or scene based on the distance/depth. For example, shader tool may be programmed to map varying color to depth information, by use of linear color gradients or color models. In some embodiments, a linear color gradient or a color sequence is a set of colors arranged in a linear order. Different color sequences may be created and stored in a gradient library, and a shader tool can be programmed to use any of the color sequences. Examples of color sequences include RGB, RWB (red, white, blue) and non-linear color models like HSV (hue, saturation, and value), HSB (hue, saturation, and brightness), or HSL (hue, saturation, and lightness). Typically, a shader tool is programmed to change the color of a portion of the source content depending on the depth value associated with the portion of the source content. The color would change in a manner determined by the color sequence used by the shader tool.

In some embodiments, a size change of an image can present a perception of z-axis motion of the image towards and away from the viewing window. The content-generation system 1205 can use the below techniques for causing the 3D spatial image 1225 to appear to move towards and/or away from the viewer 1230.

Figure 13:
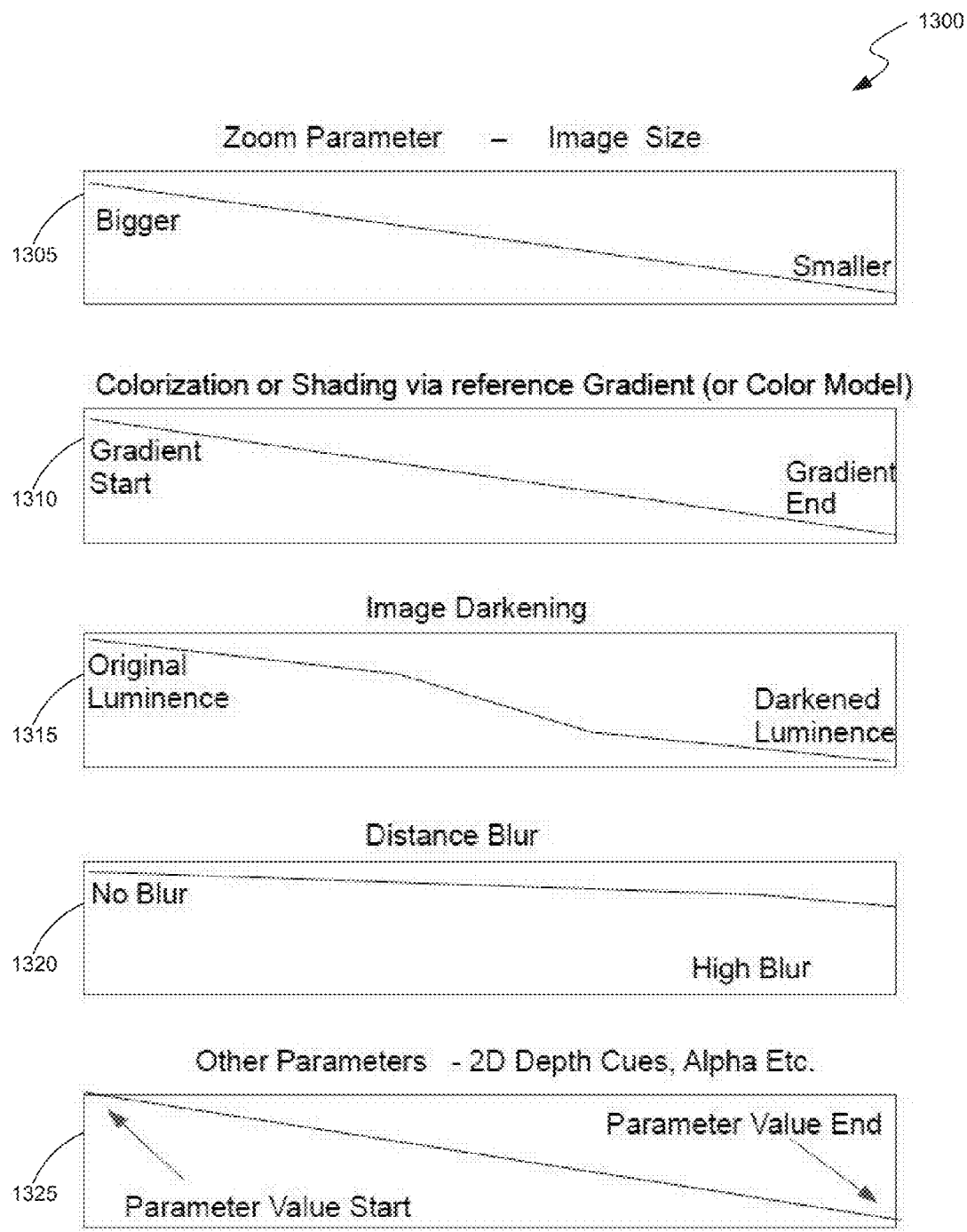
FIG. 13 is a relationship map that depicts relationships between a zoom parameter and other parameters of an image, consistent with various embodiments.

FIG. 13 is a relationship map 1300 that depicts relationships between a zoom parameter and other parameters of an image, consistent with various embodiments. As depicted in block 1305, in some embodiments, when the image in the 2D content gets smaller, the image in the 3D spatial image undergoes a linear motion away from the viewer, and when the image in the 2D content gets bigger, the image in the 3D spatial image undergoes a linear motion towards the viewer. That is, the zoom parameter goes from near to far, while changing image size from bigger to smaller.

Block 1310 depicts a relationship between the zoom parameter and the color parameter of the image. For example, by changing the color of the image from a color sequence, a perception of z-axis motion of the image towards and away from the viewing window can be provided in the 3D spatial image.

Block 1315 depicts a relationship between the zoom parameter and the luminance parameter of the image. In some embodiments, by changing the luminance of the image, a perception of z-axis motion of the image towards and away from the viewing window can be provided in the 3D spatial image. For example, by decreasing the luminance of an image (without color/hue shifts) in the 2D content, the image in the 3D spatial image undergoes a linear motion away from the viewer, and by increasing the luminance of the image (without color/hue shifts) in the 2D content, the image in the 3D spatial image undergoes a linear motion towards the viewer. In some embodiments, luminance information of the 2D image is specified by the reference gradient or color model, in addition to hue and other color information. Decreasing and increasing the luminance of image elements, which is different from hue shift, is useful for varying an image element's spatial depth, without color/hue shifts.

Block 1320 shows a relationship between the image distance blur parameter and the zoom parameter in a non-linear manner. By varying the distance blur parameter from no blur to high blur, the image in 3D spatial image appears to move from closer to the viewer to away from the viewer.

Various other parameters of the image, e.g., 2D depth cues, alpha, etc. can be changed to vary the zoom parameter of the image, that is, cause the image to appear to move towards and away from the viewer.

In addition to image, object, subject or scene capture with devices which capture and provide depth information, such as the Kinect or Lytro, traditional green screen techniques may be used to generate the 2D content. In some embodiments, a green screen technique is a method of photographing or filming an actor or an object against a green monochrome backdrop, and replacing the backdrop area (typically background) with a different image using a color filter. In some embodiments, real world scenes, objects and human subjects can also be spatially displayed on either viewing configurations. Traditional green screen techniques can be used to capture objects and subjects. The objects or subjects can be colorized for proper spatial placement within a 3D scene. The 3D scene can be a mixture of many elements. The captured area of the green monochrome backdrop may be replaced by transparency channel information in a RGBA image. This can allow for alpha compositing as described earlier. 2D images captured via green screen techniques may be shaded or colorized according to the desired depth position, by sweeping the spectrum of a 'reference gradient' or color model, along with image scaling and other techniques, e.g., as described with zoom parameter.

Figure 14:
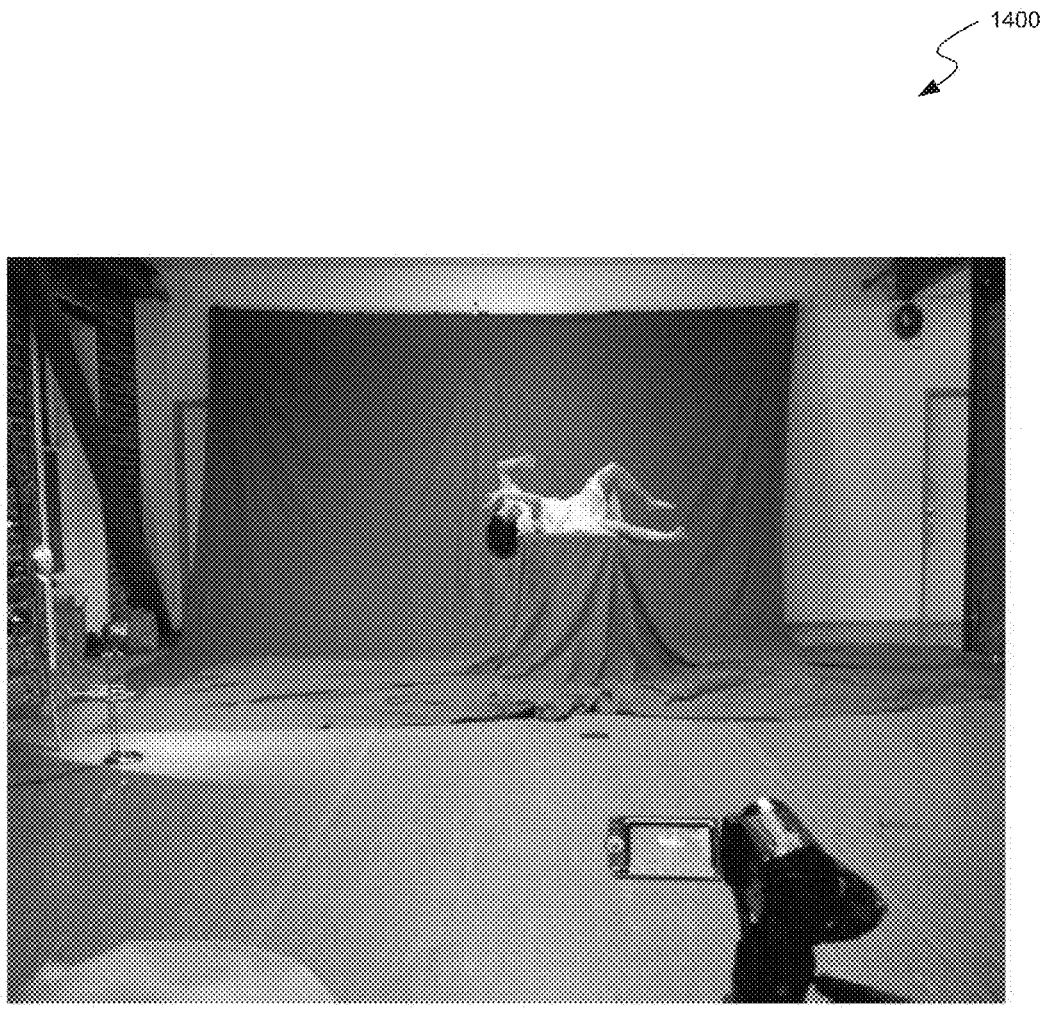
FIG. 14 is an example picture of a human subject captured using traditional green screen techniques for generating a 2D color-encoded content, consistent with various embodiments.

FIG. 14 is an example picture 1400 of a human subject captured using traditional green screen techniques for generating a 2D color-encoded content, consistent with various embodiments. The human subject can be captured using a video camera. Once captured, the multimedia file having the captured video can be accessed and the subject can be isolated from the backdrop using the content-generation system 1205 and then colorized to generate a color-encoded 2D content, which can be placed into a spatial scene using the 3D imaging system.

Figure 15:
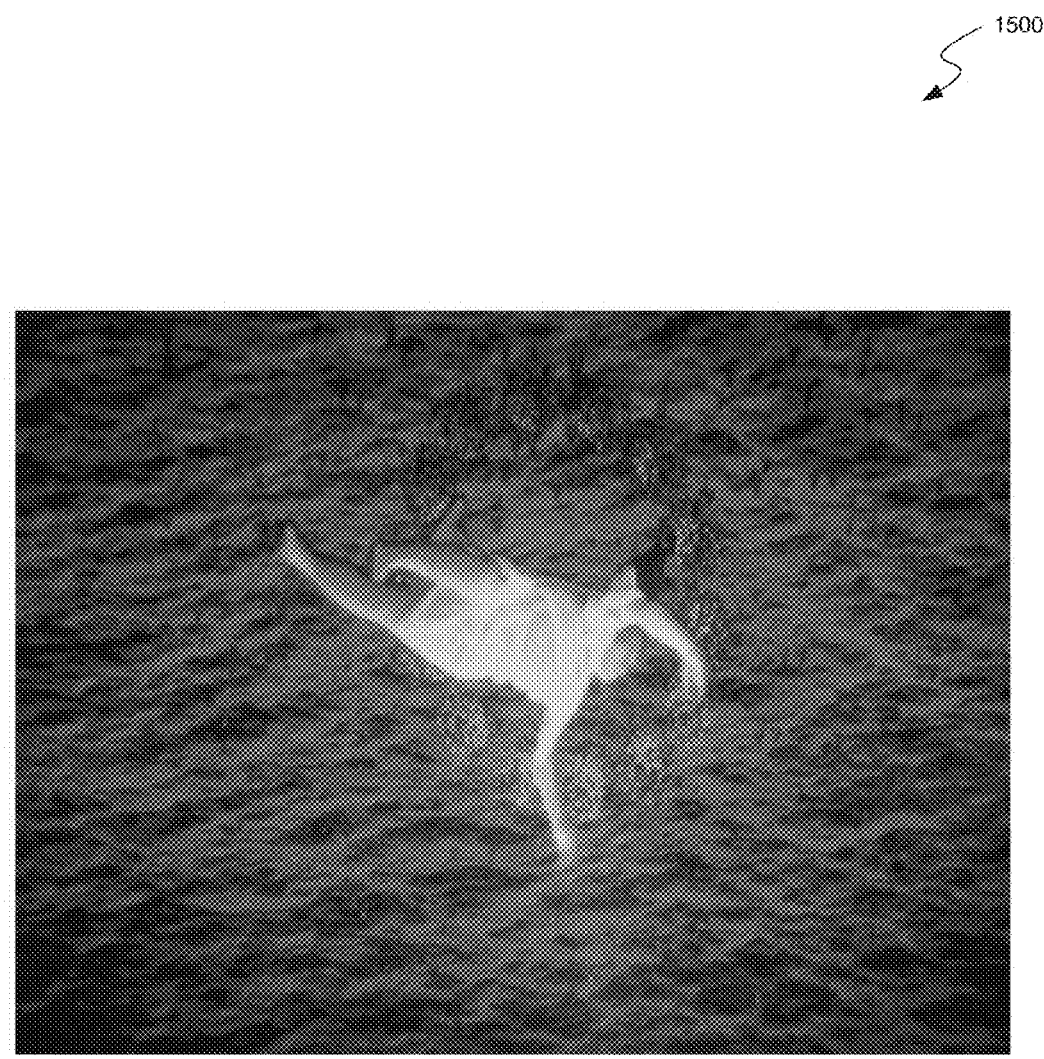
FIG. 15 is an example picture of the color-encoded human subject of FIG. 14 displayed as a 3D spatial image in the infinity viewing configuration of the 3D imaging system, consistent with various embodiments.

FIG. 15 is an example picture 1500 of the color-encoded human subject of FIG. 14 displayed as a 3D spatial image in the infinity viewing configuration of the 3D imaging system, consistent with various embodiments. The human subject is colorized using the content-generation system 1205 for spatial placement, e.g., colored with a specified color to form the human subject closer the viewer in the 3D spatial image.

As described earlier, the 2D content can be (a) images or videos of real world objects, subject or scenery, (b) CGI, or (c) a combination of both. Regardless of the type of the 2D content, the 2D content can be color encoded with modifiable color sequences or color models. Compatible images and files containing information about an image may be shared among various image processing methods for creating a 3D spatial scene which is to be graphically rendered as a 2D color encoded image. In some embodiments, it is desired to allow the different content elements move between different video, 3D or imaging environments.

Figure 16:
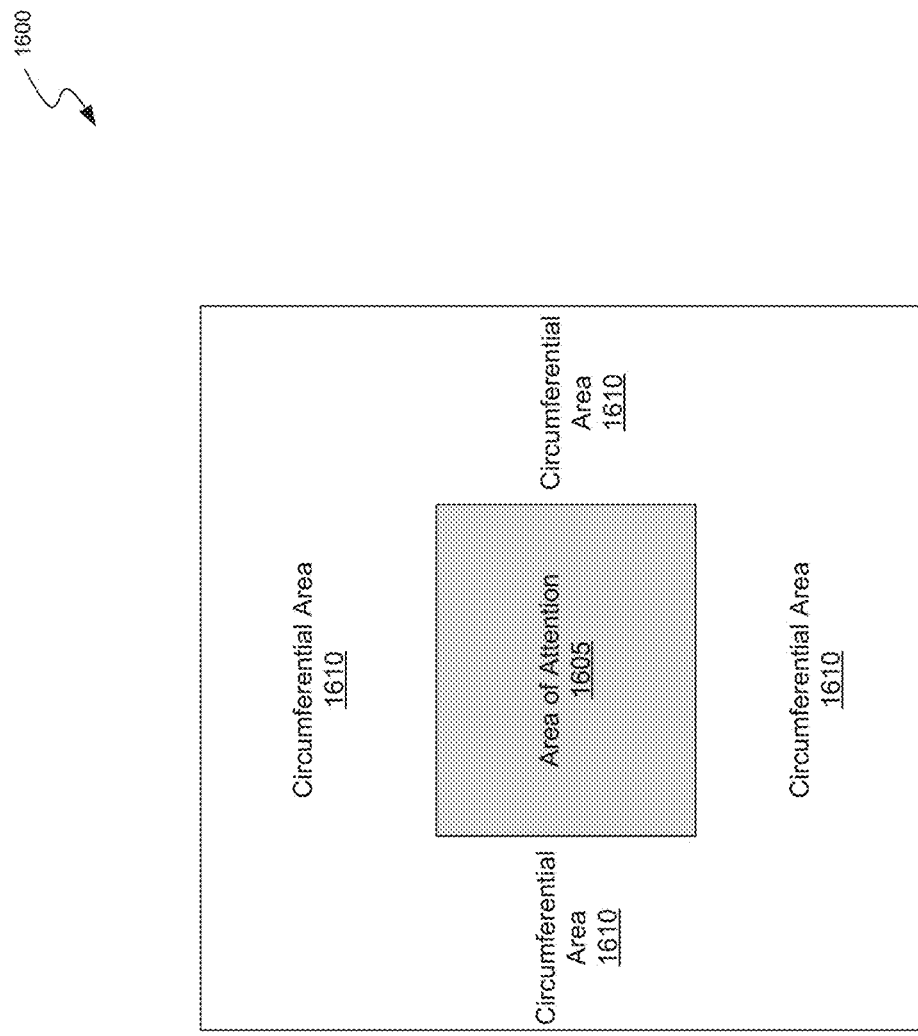
FIG. 16 is a block diagram illustrating an area of attention in which front or foreground objects of a 3D spatial image are to be formed, consistent with various embodiments.

FIG. 16 is a block diagram illustrating an area of attention in which front or foreground objects of a 3D spatial image are to be formed, consistent with various embodiments. The area of attention 1605 and circumferential area 1610, which is area around the area of attention 1605 and usually background, relate to the window parallax perceptual enhancement. The area of attention 1605 is an area in the field of view (FOV) of the viewer in which the viewer may see the entirety of the content formed in that area. In some embodiments, the area of attention 1605 and circumferential area 1610 are areas on the 2D color-encoded content 1220 that enable at the content production stage, for defining how much of the viewable content will be seen by the viewer at the center of the viewing window, e.g., viewing window 1035 of FIG. 10B. If the viewer is looking through the center of the viewing window, a FOV of the scene in the 3D spatial image 1225 is slightly larger than the area of attention 1605. Therefore, the viewer may see all the imagery contained within the area of attention 1605 in addition to a small amount of the scene in the circumferential area 1610. As the observer moves away from the center of the viewing window, e.g., to his left as illustrated in FIG. 10C, more of the circumferential area 1610, e.g., background of the scene will come into view and some of the area of attention 1605 may go out of the view. This is due to the spatial perceptual enhancement of window parallax.

In creation of a scene to be viewed as a 3D spatial image 1225, care must be taken as to align the imagery, e.g., at least the foreground objects that have to formed closest to the viewer, within the area of attention 1605, so that when the viewer is looking through the center of the viewing window all the imagery that the user is supposed to see is visible. In addition, a small amount of the circumferential peripheral area may be seen by the viewer when they are looking thought the center of the viewing window. The content-generation system 1205 can indicate to the user, e.g., the content creator, on the display of the content-generation system 1205 what portions of the screen are the area of attention 1605 and circumferential area 1610, respectively. For example, the content-generation system 1205 can generate guidelines outlining the area of attention 1605 and the circumferential area 1610. The content creator can align the 2D content within the respective areas accordingly.

Figure 17A:
FIG. 17A is an example picture of a color encoded 2D image with circumferential peripheral background and scene objects centered around area of attention, consistent with various embodiments.

FIG. 17A is an example picture 1700 of a color encoded 2D image with circumferential peripheral background and scene objects centered around area of attention, consistent with various embodiments. In the example picture 1700, a scene object, e.g., a human, that is to be formed as a foreground object in a 3D spatial image is aligned in the area of attention 1605 and the water in the background is aligned with circumferential area 1610.

Figure 17B:
FIG. 17B is an example picture of a 3D spatial image generated from the color encoded 2D image of FIG. 17A in the infinity viewing configuration, consistent with various embodiments.

FIG. 17B is an example picture 1705 of a 3D spatial image generated from the color encoded 2D image of FIG. 17A in an infinity viewing configuration, consistent with various embodiments. In the 3D spatial image of FIG. 17B, the foreground object, e.g., a human, is formed in the area of attention 1605 and the water in the background is formed as the circumferential area 1610.

Figure 18:
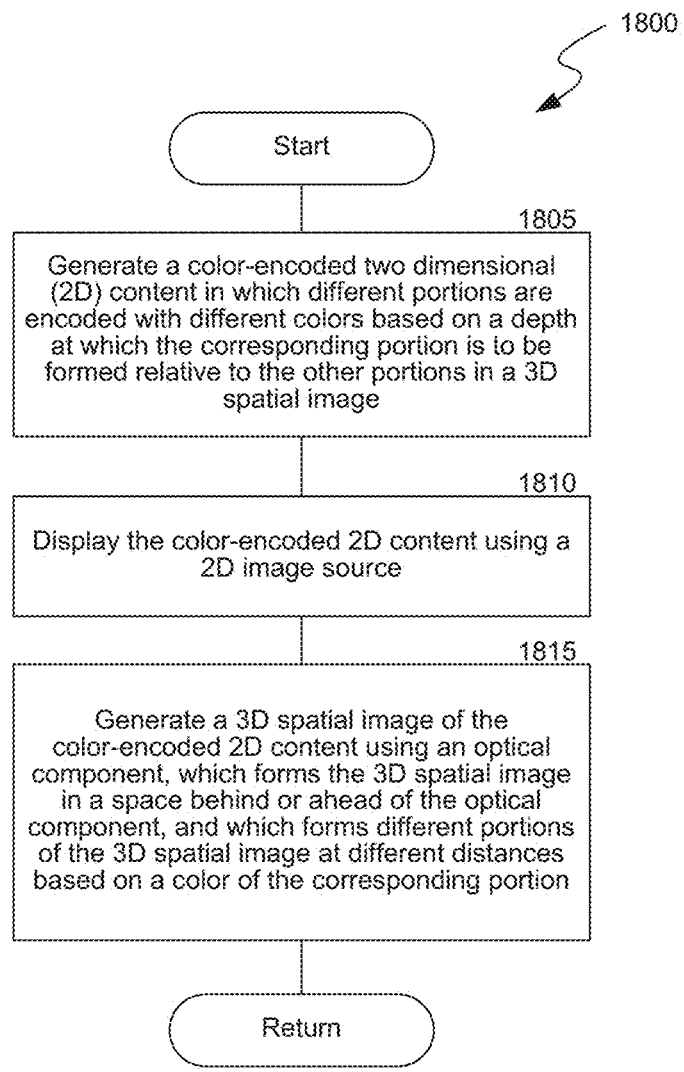
FIG. 18 is a flow diagram of a process for generating a 3D spatial image using the 3D imaging system, consistent with various embodiments.

FIG. 18 is a flow diagram of a process 1800 for generating a 3D spatial image using the 3D imaging system, consistent with various embodiments. In some embodiments, the process 1800 may be implemented in the environment 1200 of FIG. 12. At block 1805, the content-generation system 1205 generates 2D color-encoded content, e.g., 2D color-encoded content 1220 using at least the techniques described at least with reference to FIGS. 12-15. In the 2D color-encoded content 1220, different portions of the content are encoded with different colors based on depth information, which indicates a depth coordinate of the corresponding portion of the 2D content with respect to other portions of the 2D content. The 2D color-encoded content is then input to the 3D imaging system 1210.

At block 1810, the 3D imaging system 1210 displays the 2D color-encoded content using an image source, such as an LCD or LED monitor.

At block 1815, the 3D imaging system 1210 generates a 3D spatial image, e.g., 3D spatial image 1225, of the 2D color-encoded content, using an optical component of the 3D imaging system, e.g., Fresnel lens. The optical component generates the 3D spatial image 1225 in a space behind or ahead of the optical component, based on the viewing configuration of the 3D imaging system implemented. Regardless of the viewing configuration implemented, the optical component forms different portions of the 3D spatial image 1225 at different depths from the viewer in which a depth of a portion of the generated 3D spatial image is determined based on a color of that portion.

Figure 19:
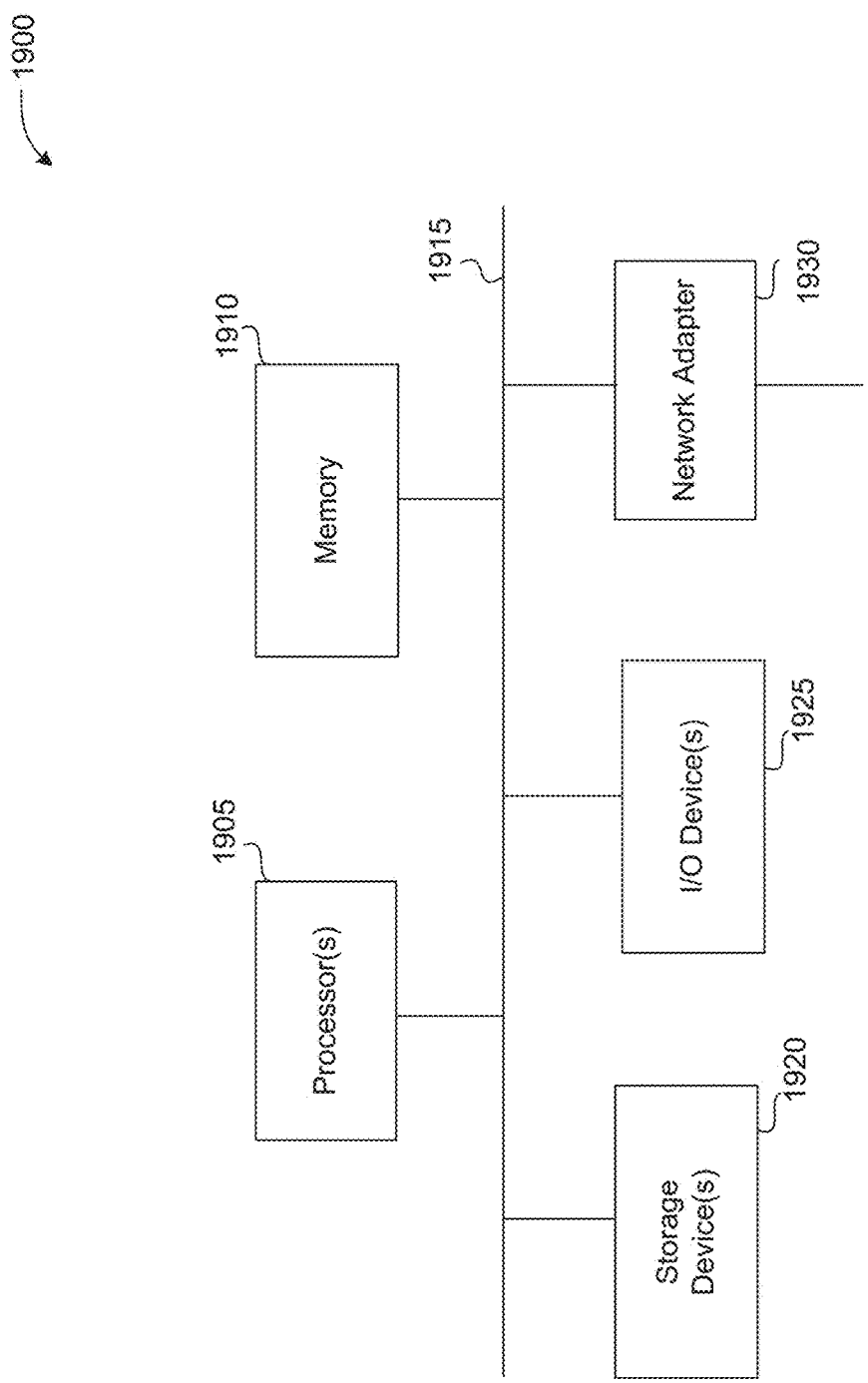
FIG. 19 is a block diagram of a processing system that can implement operations, consistent with various embodiments.

FIG. 19 is a block diagram of a computer system as may be used to implement features of the disclosed embodiments. The computing system 1900 may be used to implement any of the entities, components, modules, systems, or services depicted in the examples of the foregoing figures (and any other entities described in this specification). The computing system 1900 may include one or more central processing units ("processors") 1905, memory 1910, input/output devices 1925 (e.g., keyboard and pointing devices, display devices), storage devices 1920 (e.g., disk drives), and network adapters 1930 (e.g., network interfaces) that are connected to an interconnect 1915. The interconnect 1915 is illustrated as an abstraction that represents any one or more separate physical buses, point to point connections, or both connected by appropriate bridges, adapters, or controllers. The interconnect 1915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1910 and storage devices 1920 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 1910 can be implemented as software and/or firmware to program the processor(s) 1905 to carry out actions described above. In some embodiments, such software or firmware may be initially provided to the processing system 1900 by downloading it from a remote system through the computing system 1900 (e.g., via network adapter 1930).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc. Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. An apparatus, comprising:
    an image source that is configured to display a color-encoded two dimensional (2D) content, wherein different portions of the 2D content are encoded with different colors based on a depth at which the different portions are to be formed from a user;
    an optical component that includes a pair of lenses configured to generate a three dimensional (3D) spatial image of the 2D content, wherein the 3D spatial image is viewable as 3D content by the user without the use of 3D eyewear, wherein the optical component is configured to form different portions of the 2D content at different distances from the optical component to generate the 3D spatial image, wherein the different portions are formed at the different distances based on the color of the different portions of the 2D content, wherein the optical component generates the 3D spatial image in a space between the optical component and the user; and
    a content-generation system that is configured to encode the 2D content with a plurality of colors from a color sequence, wherein the content-generation system is configured to encode a specified portion of the 2D content with a specified color from the colors based on a position at which the specified portion is to be generated in the 3D spatial image with respect to other portions of the 2D content.

2. The apparatus of claim 1, wherein the pair of lenses is a pair of Fresnel lenses.

3. The apparatus of claim 1, wherein the pair of lenses includes a first lens of the pair and a second lens of the pair that are spaced a specified distance apart and with a side of the first lens having multiple grooves facing a side of the second Lens having the grooves.

4. The apparatus of claim 3, wherein the specified distance is determined as a function of the focal length of each lens of the pair of lenses.

5. The apparatus of claim 1, wherein the optical component includes a first side and an opposite second side, wherein a first lens of the pair of lenses facing the image source forms the first side and a second lens of the pair of lenses spaced apart from the first lens forms a second side of the optical component, wherein the optical component is configured to generate the 3D spatial image in a space between the user and the second side when the light corresponding to the 2D content from the image source passes from the first side to the second side.

6. The apparatus of claim 5, wherein the optical component is positioned in front of the image source at a first specified distance between the image source and the first lens.

7. The apparatus of claim 6, wherein the first specified distance is determined as a function of the focal length of the pair of lenses.

8. The apparatus of claim 1, wherein the content-generation system is configured to encode the 2D content by:
    analyzing a data file having the 2D content to identify different portions of the 2D content,
    obtaining relative position information of the different portions of the 2D content, wherein the relative position information includes depth information between the different portions, and
    encoding the different portions of the 2D content based on the depth information.

9. The apparatus of claim 1, wherein the content-generation system is configured to encode the different portions by:
    encoding a first portion of the portions that is to be displayed farthest from the optical component with a first color,
    encoding a second portion of the portions that is to be displayed nearest to the optical component with a second color, and
    encoding a third portion of the portions that is to be displayed between the first portion and the second portion with a third color, wherein displaying different portions of the 2D content at different distances from the optical component makes the 2D content appear as 3D content.

10. The apparatus of claim 9, wherein the second portion acts as a background of the 3D spatial image and the first portion acts as a foreground of the 3D spatial image.

11. The apparatus of claim 9, wherein the content-generation system is configured to control a size of the first portion by adjusting a zoom parameter for the first portion.

12. The apparatus of claim 9, wherein the content-generation system is configured to control a distance at which the first portion is generated by adjusting a gradient of the first color.

13. The apparatus of claim 1 further comprising:
a mask system that is positioned between the optical component and the user and configured to cover edges of the pair of lenses, wherein the mask system is configured to enhance a spatial perception of the 3D spatial image.

14. The apparatus of claim 13, wherein the mask system includes a first mask that is positioned in front of the optical component and a second mask that is positioned in front of the first mask, wherein the first mask has a first opening and the second mask has a second opening that overlaps with a portion of the first opening, the second opening being smaller than the first opening, and wherein the 3D spatial image is projected into the space between the user and the optical component through the first opening and the second opening.

15. The apparatus of claim 14, wherein the 2D content is generated to project a specified portion of the 2D content in the space between the user and the optical component centered in area corresponding to the second opening.

16. An apparatus, comprising:
an image source that is configured to display a color-encoded two dimensional (2D) content;
an optical component that includes a lens configured to generate a three dimensional (3D) spatial image of the 2D content, wherein the optical component generates the 3D spatial image in a space behind the optical component and on a side of the optical component facing the image source, wherein the optical component is configured to form different portions of the 2D content at different distances from the optical component based on the color of the different portions of the 2D content, wherein the 3D spatial image is viewable as 3D content by a user without the use of 3D eyewear; and
a content-generation system that is configured to encode the 2D content with a plurality of colors from a color sequence, wherein the content-generation system is configured to encode different portions of the 2D content with different colors from the color sequence based on a position at which the corresponding portion is to be generated in the 3D spatial image with respect to other portions of the 2D content.

17. The apparatus of claim 16, wherein the lens is a Fresnel lens.

18. The apparatus of claim 16, wherein the lens is positioned in front of the image source with a side of the lens having multiple grooves facing the user and another side of the lens facing the image source.

19. The apparatus of claim 16, wherein the optical component is further configured to generate an apparent image source when the image source is viewed through the lens, the apparent image source being a magnified view of the image source.

20. The apparatus of claim 19, wherein the optical component is further configured to generate the apparent image source at optical infinity.

21. A method comprising:
generating, using a computer system, a color-encoded two-dimensional (2D) content, wherein different portions of the 2D content is encoded with different colors based on depth information, the depth information indicating a depth coordinate of the corresponding portion of the 2D content in a three-dimensional (3D) space;
displaying, using a 2D image source, the color-encoded 2D content;
generating, using an optical component, a 3D spatial image of the color-encoded 2D content, wherein the optical component generates the 3D spatial image in a space behind or ahead of the optical component, wherein a depth of a portion of the different portions in the generated 3D spatial image is determined based on a color of the portion; and
encoding the 2D content with a plurality of colors from a color sequence, the encoding including encoding different portions of the 2D content with different colors from the color sequence based on a position at which the corresponding portion is to be generated in the 3D spatial image with respect to other portions of the 2D content.

22. The method of claim 21, wherein generating the 3D spatial image includes generating the 3D spatial image using a pair of lenses and forming the 3D spatial image in a space between a user and the pair of lenses.

23. The method of claim 21, wherein generating the 3D spatial image includes generating the 3D spatial image using a single lens, and forming the 3D spatial image in a space behind the single lens.

* * * * *